(12) United States Patent
Nakamura et al.

(10) Patent No.: US 9,317,519 B2
(45) Date of Patent: *Apr. 19, 2016

(54) STORAGE SYSTEM FOR ELIMINATING DUPLICATED DATA

(71) Applicant: HITACHI, LTD., Chiyoda-ku, Tokyo (JP)

(72) Inventors: Takaki Nakamura, Ebina (JP); Akira Yamamoto, Sagamihara (JP); Masaaki Iwasaki, Tachikawa (JP); Yohsuke Ishii, Yokohama (JP); Nobumitsu Takaoka, Sagamihara (JP)

(73) Assignee: HITACHI, LTD., Tokyo (JP)

( * ) Notice: Subject to any disclaimer, the term of this patent is extended or adjusted under 35 U.S.C. 154(b) by 7 days.

This patent is subject to a terminal disclaimer.

(21) Appl. No.: 14/310,487

(22) Filed: Jun. 20, 2014

(65) Prior Publication Data

US 2014/0304242 A1    Oct. 9, 2014

Related U.S. Application Data

(63) Continuation of application No. 13/606,683, filed on Sep. 7, 2012, now Pat. No. 8,793,227, which is a continuation of application No. 12/663,885, filed as application No. PCT/JP2009/004744 on Sep. 18, 2009, now Pat. No. 8,285,690.

(51) Int. Cl.
*G06F 3/06* (2006.01)
*G06F 17/30* (2006.01)

(52) U.S. Cl.
CPC .......... *G06F 17/30156* (2013.01); *G06F 3/067* (2013.01); *G06F 3/0608* (2013.01); *G06F 3/0641* (2013.01); *G06F 3/0658* (2013.01)

(58) Field of Classification Search
CPC ............ G06F 17/30156; G06F 3/0608; G06F 3/0641; G06F 3/0658; G06F 3/067
See application file for complete search history.

(56) References Cited

U.S. PATENT DOCUMENTS

| 5,732,265 | A  | 3/1998  | Dewitt et al.     |
|-----------|----|---------|-------------------|
| 7,519,635 | B1 | 4/2009  | Haustein et al.   |
| 7,747,584 | B1 | 6/2010  | Jernigan, IV      |
| 7,814,149 | B1 | 10/2010 | Stringham         |
| 7,822,939 | B1 | 10/2010 | Veprinsky et al.  |
| 7,836,053 | B2 | 11/2010 | Naef, III         |

(Continued)

FOREIGN PATENT DOCUMENTS

| EP | 2 031 494 A2 | 3/2009 |
|----|--------------|--------|
| EP | 2 063 351 A2 | 5/2009 |

(Continued)

*Primary Examiner* — Jorge A Casanova
(74) *Attorney, Agent, or Firm* — Mattingly & Malur, PC

(57) ABSTRACT

A storage system 103 carries out first and second de-duplication processes in response to receiving a write request from a client. First, a determination is made as to whether a write target data item overlaps with any of the stored data items of a part of a stored data item group, which is a user data item group stored in a storage device 209, and if so, the write target data item is prevented from being stored in the storage device. Second, a determination is made as to whether a target stored data item, which is not finished being evaluated as to whether it overlaps with the stored data item in the first de-duplication process, overlaps with another stored data item, and if so, the target stored data item or the same data item overlapping with the target stored data item is deleted from the storage device 209.

3 Claims, 25 Drawing Sheets

(56) References Cited

U.S. PATENT DOCUMENTS

| | | |
|---|---|---|
| 7,840,537 B2 | 11/2010 | Gokhale et al. |
| 7,899,789 B2 | 3/2011 | Schwaab et al. |
| 7,913,114 B2 | 3/2011 | Leppard |
| 7,921,086 B1 | 4/2011 | Bromley et al. |
| 7,925,683 B2 | 4/2011 | Jain et al. |
| 7,949,662 B2 | 5/2011 | Farber et al. |
| 7,953,706 B2 | 5/2011 | Prahlad et al. |
| 7,962,706 B2 | 6/2011 | Davis |
| 7,979,670 B2 | 7/2011 | Saliba et al. |
| 7,984,022 B2 | 7/2011 | Cannon et al. |
| 7,996,371 B1 | 8/2011 | Deshmukh |
| 2003/0097359 A1 | 5/2003 | Ruediger |
| 2003/0167253 A1 | 9/2003 | Meinig |
| 2005/0182780 A1 | 8/2005 | Forman et al. |
| 2007/0233707 A1 | 10/2007 | Osmond et al. |
| 2008/0098083 A1 | 4/2008 | Shergill et al. |
| 2008/0243946 A1 | 10/2008 | Deguchi et al. |
| 2008/0244172 A1 | 10/2008 | Kano et al. |
| 2008/0288482 A1 | 11/2008 | Chaudhuri et al. |
| 2009/0063795 A1 | 3/2009 | Yueh et al. |
| 2009/0063883 A1 | 3/2009 | Mori |
| 2009/0089483 A1 | 4/2009 | Tanaka et al. |
| 2009/0171888 A1 | 7/2009 | Anglin |
| 2009/0192978 A1 | 7/2009 | Hewett et al. |
| 2009/0204636 A1 | 8/2009 | Li et al. |
| 2009/0204649 A1 | 8/2009 | Wong et al. |
| 2009/0217091 A1 | 8/2009 | Miyamoto et al. |
| 2009/0234795 A1 | 9/2009 | Haas et al. |
| 2009/0259701 A1 | 10/2009 | Wideman et al. |
| 2009/0271402 A1 | 10/2009 | Srinivasan et al. |
| 2011/0055471 A1* | 3/2011 | Thatcher ............... G06F 3/0608 711/114 |

FOREIGN PATENT DOCUMENTS

| | | |
|---|---|---|
| JP | 2005-274991 A | 10/2005 |
| JP | 2008-243138 A | 10/2008 |
| JP | 2009-059096 A | 3/2009 |
| JP | 2009-087021 A | 4/2009 |
| WO | 2009/066611 A1 | 5/2009 |

\* cited by examiner

FIG. 4

USER DATA MANAGEMENT INFORMATION — 310

401

| GLOBAL PATH (LOGICAL BLOCK NUMBER) | NAME HASH VALUE | DATA HASH VALUE | DATA ID |
|---|---|---|---|
| /groot/user1/data1 | 0xb | 0x1 | 100 |
| /groot/user2/data1 | 0x7 | 0x1 | 100 |
| /groot/user2/data2 | 0x7 | 0xf | 101 |
| /groot/user2/data3 | 0x2 | 0xf | 102 |
| /groot/user2/data4 | 0x8 | 0x5 | 103 |
| /groot/user2/data5 | 0x3 | 0x6 | 104 |
| /groot/user3/data1 | 0x3 | 0xa | 200 |
| /groot/user3/data2 | 0x1 | 0x1 | 300 |

402

| DATA ID | DATA HASH VALUE | DUPLICATION NUMBER | TOTAL EVALUATION FLAG | LIST GENERATION NUMBER | SYNCHRONOUS EVALUATION MAXIMUM RANK | LOCAL PATH (PHYSICAL BLOCK NUMBER) | FINGERPRINT DATA PATH |
|---|---|---|---|---|---|---|---|
| 100 | 0x1 | 2 | Y | 0 | 0 | /local1/data100 | /local1/fp100 |
| 101 | 0xf | 1 | Y | 1 | 1 | /local1/data101 | /local1/fp101 |
| 102 | 0xf | 1 | Y | 1 | 1 | /local1/data102 | /local1/fp102 |
| 103 | 0x5 | 1 | Y | 1 | 1 | /local1/data103 | /local1/fp103 |
| 104 | 0x6 | 1 | Y | 1 | 1 | /local1/data104 | /local1/fp104 |
| 200 | 0xa | 1 | Y | 2 | 4 | /local2/data200 | /local2/fp200 |
| 300 | 0x1 | 1 | N | 2 | 4 | /local2/data300 | |

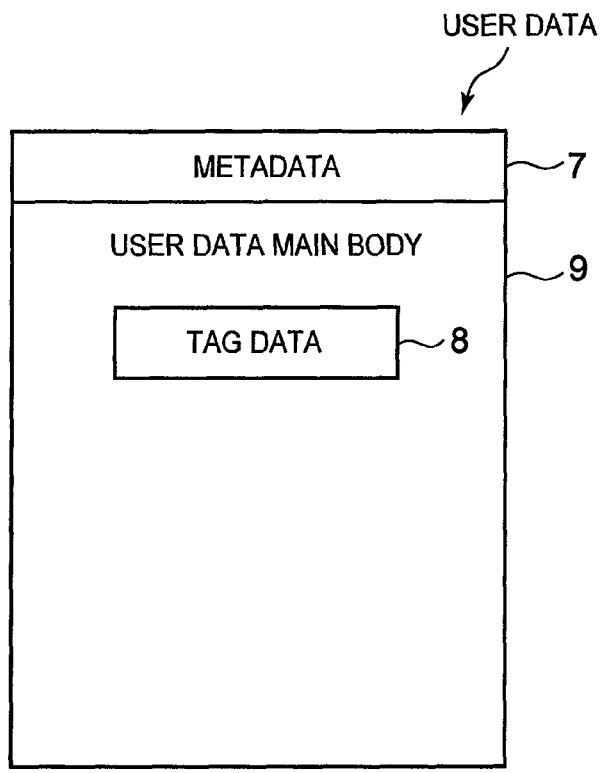

STORAGE SYSTEM FOR ELIMINATING DUPLICATED DATA

This application is a continuation of U.S. patent application Ser. No. 13/606,683, filed Sep. 7, 2012, which is a continuation of U.S. patent application Ser. No. 12/663,885, filed Dec. 10, 2009, now U.S. Pat. No. 8,285,690, which is a 371 of PCT/JP2009/004744, filed Sep. 18, 2009. The entire disclosures of these application are incorporated by reference herein.

TECHNICAL FIELD

The present invention relates to a storage system, and particularly to a technology for eliminating duplicated data.

BACKGROUND ART

In the field of recent storage systems, a technology for eliminating duplicated data without having a user be aware of the elimination (to be referred to as "de-duplication technology" hereinafter) has been attracting attention. A storage system applied with the de-duplication technology conceals the elimination of duplicated data by disposing a virtualization layer. Therefore, with the application of the de-duplication technology, a user can access user data by means of a conventional access method, and at the same time use a limited data storage area within the storage system with a high degree of efficiency.

A de-duplication system includes a complete matching system and a non-complete matching system. In the complete matching system, for example, an I/O request received from a client is of a block level or a file level. In the case of the block level, when the content of a certain block data matches the content of another block data, the blocks are determined as duplicated data, and one of the blocks is eliminated. In the case of the file level, when the content of a certain file completely matches the content of another file, the files are determined as duplicated data, and one of the files is eliminated (see Patent Literature 1, for example). In the non-complete matching system, on the other hand, an I/O request received from the client is of the file (particularly contents) level. In the case of the contents level, for example, the features of certain contents and of other contents are extracted, and when the degree of similarity between these features is high, these contents are determined as duplicated data (see Patent Literature 2, for example).

CITATION LIST

Patent Literature

[PTL 1]
U.S. Pat. No. 5,732,265
[PTL 2]
Japanese Patent Application Publication No. 2005-274991

SUMMARY OF INVENTION

Technical Problem

In the conventional de-duplication method, comparison is carried out to determine whether or not data to be subjected to de-duplication overlaps with all of data items that are likely to overlap. Therefore, for example, when the number of data items or the size of the data subjected to the comparison expands, processing performance decreases significantly.

Furthermore, when the number of data items subjected to the comparison expands, a cache miss likely to occur, and therefore a low-speed metadata index needs to be referenced. As a result, the processing performance decreases significantly.

On the other hand, when the number of data items subjected to the comparison expands, the data items can be distributed to a plurality of storage devices and the storage devices can be allowed to process the data items, in order to improve the processing performance. However, it is difficult to improve the performance significantly, because a de-duplication process is performed by referring to the information on a disk instead of a cache.

An object of the present invention therefore is to improve the performance of the de-duplication process.

Solution to Problem

When receiving a write request from a client, a storage device carries out a first de-duplication process, and thereafter carries out a second de-duplication process at an appropriate time. In the first de-duplication process, it is determined whether or not a write target data item overlaps with any of stored data items of a part of a stored data item group, which is a user data item group stored in a storage device. When the result of the determination is positive, the write target data item is not stored in the storage device. In the second de-duplication process, it is determined whether or not a target stored data item, which is not finished with an evaluation of whether or not it overlaps with the stored data item in the first de-duplication process, overlaps with another stored data item. When the result of the determination is positive, the target stored data item or the same data item overlapping with the target stored data is deleted from the storage device.

A controller has a processor, which may carry out each of the processes by executing a computer program. The computer program may be installed from a distant server or from a storage medium (for example, a CD-ROM, DVD (Digital Versatile Disk), or other portable storage medium). At least a part of the controller may be realized by a hardware circuit.

BRIEF DESCRIPTION OF DRAWINGS

FIG. 4 is a diagram showing an example of user data management information.

FIG. 5 is a diagram for illustrating additional data.

FIG. 6 is a diagram showing an example of full list information.

DESCRIPTION OF EMBODIMENTS

Several examples of the present invention will be described hereinafter with reference to the drawings.

Example 1

Figure 1:
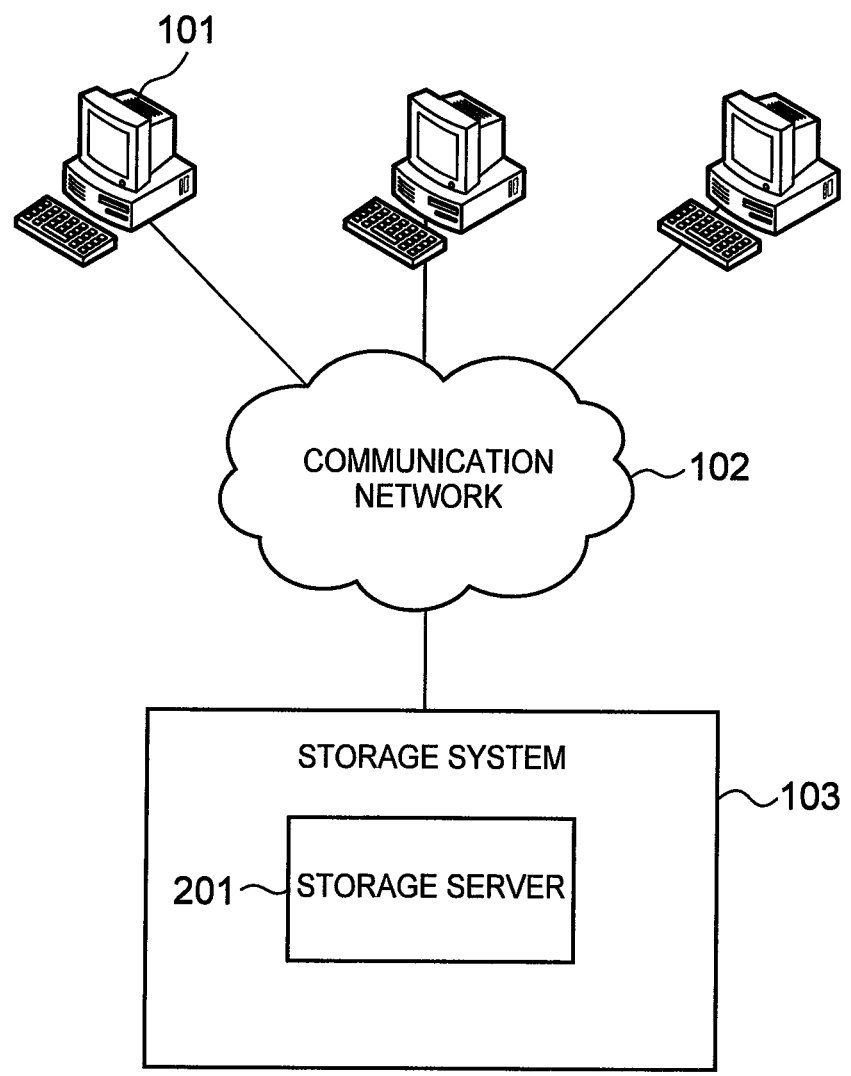
FIG. 1 is a diagram showing a configuration example of a computer system according to Example 1.

FIG. 1 is a diagram showing a configuration example of a computer system according to Example 1.

One or more clients 101 are coupled to a storage system 103 via a communication network 102. Examples of the communication network 102 include an IP (Internet Protocol) network and an FC (Fiber Channel) network.

The client 101 is a computer for transmitting an I/O request (a read request or a write request) to the storage system 103. Examples of the I/O request include an I/O request of a file (including contents) level, and an I/O request of a block level. The I/O request of a file level is used for specifying a user data item, which is a target of the I/O request, for each file and requests I/O of the specified user data (file). In the case of the I/O request of a file level, the user data (file) that is the target of I/O is specified by a logical path representing a storage destination for storing the user data (file). Hereinafter, the logical path representing a user data storage destination for each file is called "global path." The I/O request of a block level, on the other hand, specifies user data, which is a target of the I/O request, for each block and requests I/O of the specified user data (block data). In the I/O request of a block level, the user data (block data) that is the target of I/O is specified by a logical block number. The following description illustrates and example in which an I/O request that is mainly received from the client 101 is the I/O request of a file level, but the description can be applied to the case where the I/O request is the I/O request of a block level.

The storage system 103 has a storage server 201. In the present example, one storage server 201 is provided in the storage system 103. The configuration of the storage server 201 is described hereinafter with reference to FIGS. 2 to 6.

Figure 2:
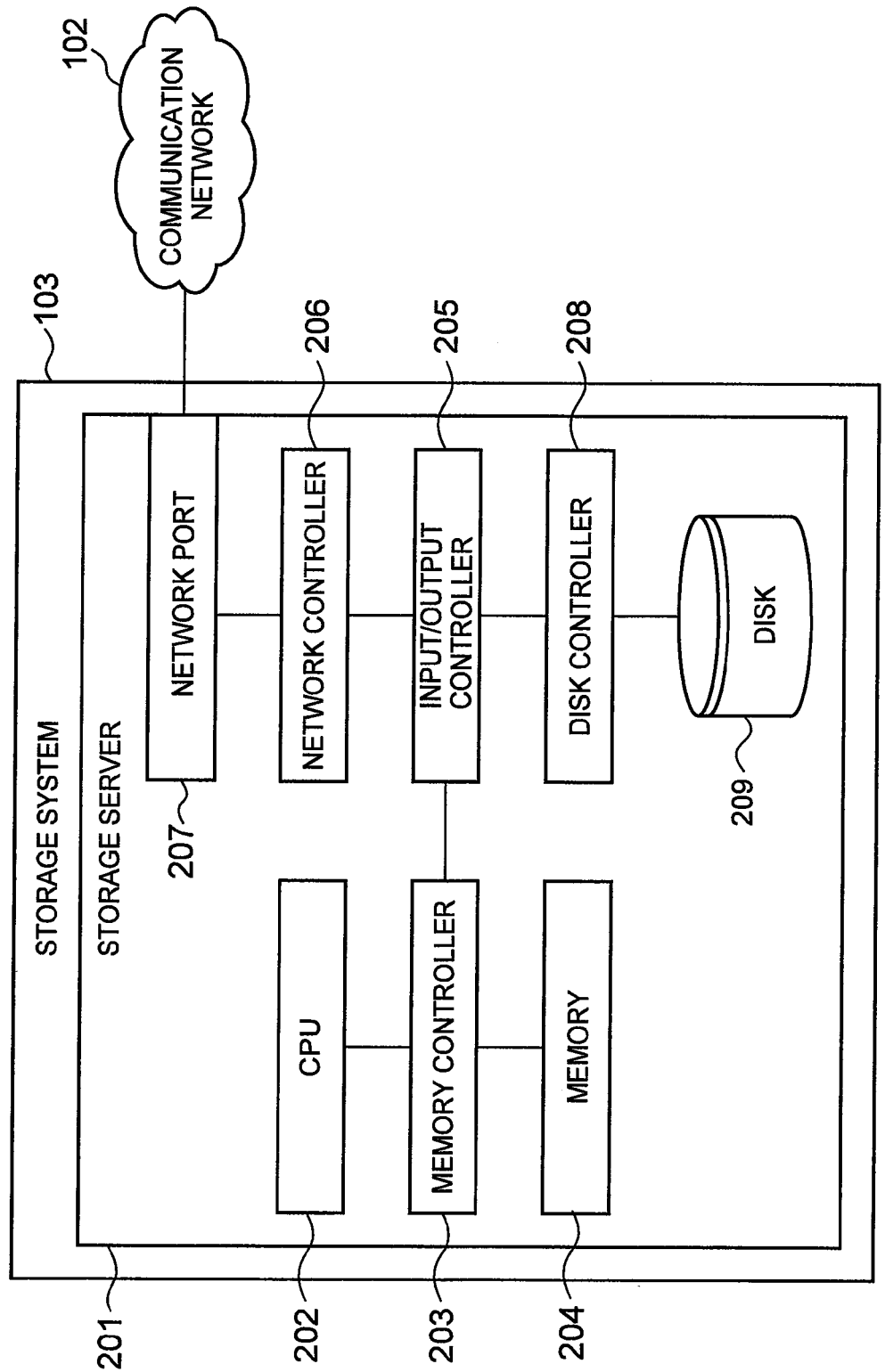
FIG. 2 is a diagram showing a hardware configuration example of a storage server.

FIG. 2 is a diagram showing a hardware configuration of the storage server 201.

The storage server 201 has, for example, a CPU (Central Processing Unit) 202, a memory controller 203, a memory 204, an input/output controller 205, a network controller 206, a network port 207, a disk controller 208, and a disk 209. These parts 202 to 209 are coupled together in a manner shown in, for example, FIG. 2. Specifically, the CPU 202, memory 204, and input/output controller 205 are coupled to the memory controller 203. The network controller 206 and the disk controller 208 are coupled to the input/output controller 205. The network port 207 is coupled to the network controller 206, and the disk 209 is coupled to the disk controller 208.

Note that the disk 209 may be provided in plurality. One disk 209 or at least one of the plurality of disks 209 may be configured as an external disk (a disk provided externally to the storage server 201). The storage server 201 and the external disk are coupled to each other via, for example, the IP network, FC network, or the like.

Figure 3:
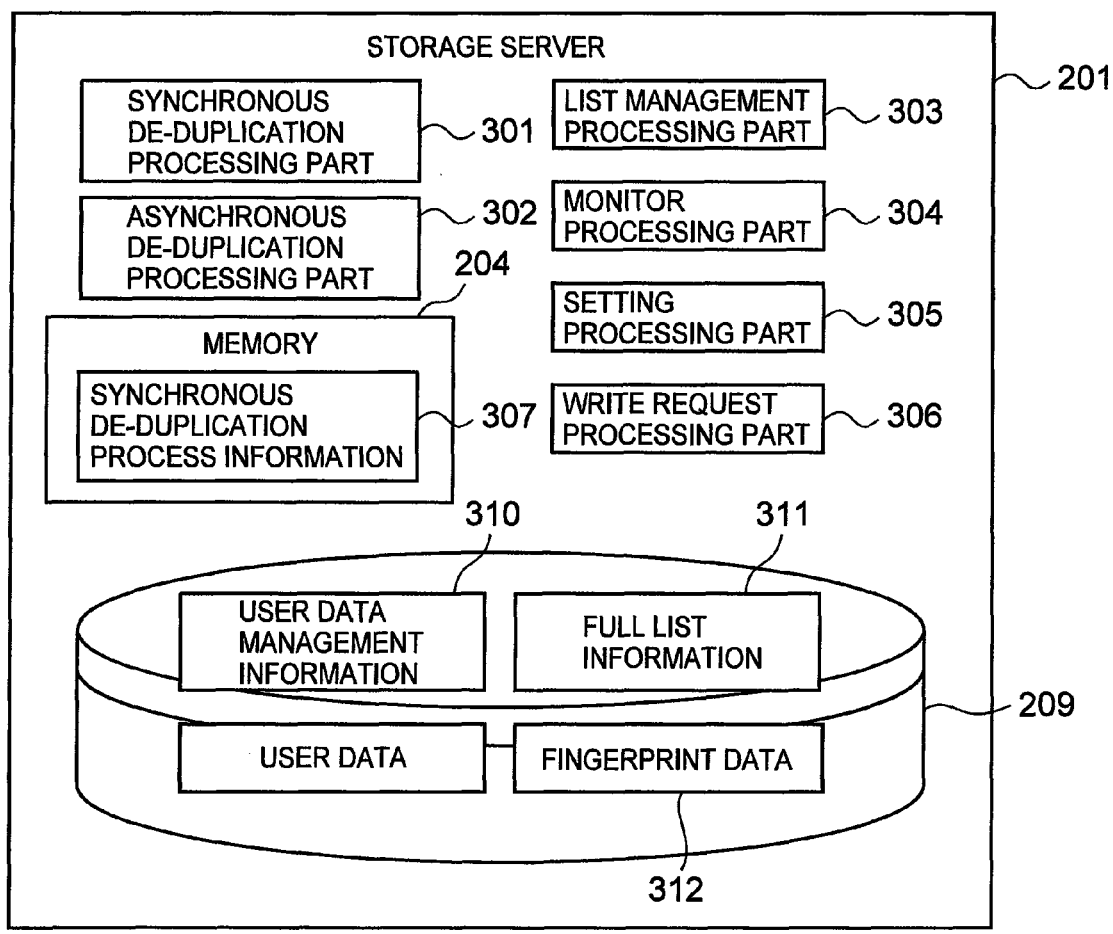
FIG. 3 is a diagram showing a software configuration example of the storage server.

FIG. 3 is a diagram showing a software configuration of the storage server 201.

The storage server 201 has, for example, a synchronous de-duplication processing part 301, an asynchronous de-duplication processing part 302, a list management processing part 303, a monitor processing part 304, a setting processing part 305, and a write request processing part 306. Various computer programs for realizing the functions of the processing parts 301 to 306 are stored in the memory 204 of the storage server 201. The CPU 202 of the storage server 201 realizes the functions of the processing parts 301 to 306 by executing the various programs stored in the memory 204. Specific processes carried out the processing parts 301 to 306 are described hereinafter.

The memory 204 has stored therein a synchronous process information 307 that is referenced when a synchronous de-duplication process is carried out. Note that the synchronous process information 307 may be stored in a device that can be accessed at higher speed than the disk 209. Therefore, the synchronous process information 307 may be stored not only in the memory 204 but also in, for example, an SSD (Solid State Drive).

In addition to the user data that is requested to be written by the client 101, for example, user data management information 310, full list information 311, and fingerprint data 312 are stored in the disk 209. The fingerprint data 312 is data that is obtained by extracting the features of the user data from the user data and represents the features of the user data. The storage server 201 can not only acquire the fingerprint data 312 of the target user data from the outside of the storage server 201, but also generate the fingerprint data 312 by itself.

The storage server 201 according to the present example carries out a process for preventing user data items having the same contents from overlapping with each other and being stored in a storage device (the disk 209 in the present example) (to be referred to as "de-duplication process" hereinafter). The de-duplication process according to the present example has two types of de-duplication processes: a de-duplication process that is carried out when a write request is received (to be referred to as "synchronous de-duplication process"), and a de-duplication process that is carried at an appropriate time, regardless of when the write request is received (to be referred to as "asynchronous de-duplication process"). The synchronous de-duplication process is carried out by the synchronous de-duplication processing part 301, and the asynchronous de-duplication process is carried out by the asynchronous de-duplication processing part 302.

In the de-duplication process, two user data items (a write target user data item and one selected user data item in the case of the synchronous de-duplication process, and two selected user data items in the case of the asynchronous de-duplication process), and it is determined whether these user data items are identical or not. In the de-duplication process according to the present example, when the data contents of the two user data items completely match, or when it can be determined that the degree of similarity between the two user data items is high and that therefore the two user data items are substantially the same even when there is a mismatch between the data contents, it is determined that the both user data items are identical. Hereinafter, a system for determining whether user data items are identical or not by determining whether data contents thereof completely match or not is called "a complete matching system," and a system for determining whether user data items are identical or not by determining whether or not the user data items can be determined as substantially identical is called "a non-complete matching system." Specifically, in the de-duplication process using the non-complete matching system, it is determined whether the user data items can be determined as substantially identical or not, based on, for example, additional data or feature data. Here, "additional data" means data added to user data (user data main body), which represents the attributes of the user data (metadata, tag data, and the like). "Feature data" means data representing the features of the user data, and is, for example, the fingerprint data 312. For example, the de-duplication process using the complete matching system can be employed when the I/O request received from the client 101 is the I/O request of a file level and the I/O request of a block level. On the other hand, the de-duplication process using the non-compete matching system can be employed when the I/O request received from the client 101 is the I/O request of a file (especially contents) level.

FIG. 4 is a diagram showing an example of the user data management information 310.

The user data management information 310 includes, for example, a global path management table 401, which is information for managing the global path, and a local path management table 402, which is information for management a local path. Here, "local path" means a physical path that is referenced within the storage system 103 and represents a data storage destination.

In the global path management table 401, the global path, a name hash value, a hash value, and a data ID are associated with written data for each written data item. Here, "written data" is the user data that is written to the storage server 201 when the client 101 transmits a write request, that is, the user data that is the target of the write request processed normally. The written data corresponds to any one of the user data items actually stored in the disk 209 (to be referred to as "stored data" hereinafter). The association between the written data and the stored data is managed by the data ID. In other words, when the data ID of the written data (the one managed by the global path management table 401) is the same as the data IDs of the stored data items (the ones managed by the local path management table 402), these data items are associated with each other. Note that when the I/O request received from the client 101 is the I/O request of a block level, the logical block number is stored in place of the global path.

The name hash value is a hash value generated from the global path. The name hash value is utilized in Example 2. Therefore, in the present example, the name hash value is not necessarily included in the global path management table 401. The data hash value is a hash value that is generated from the user data or additional data (metadata, tag data, etc.). When the complete matching system is employed, the hash value generated from the user data is taken as the data hash value. When, on the other hand, the non-complete matching system is employed, the hash value generated from the additional data is taken as the data hash value. Note in the following description that "data hash value" similarly indicates a hash value generated from the user data when the complete matching system is employed, and also indicates a hash value generated from the additional data when the non-complete matching system is employed.

Here, metadata 7 and tag data 8 are simply described with reference to FIG. 5. Both of the data items 7, 8 are data items added to a user data main body 9 and representing data items representing the attributes of the user data main body 9. As shown in FIG. 5, the metadata 7 is data added externally to the user data main body 9. The user data is configured by the metadata 7 and the user main body 9. On the other hand, the tag data 8 is data contained inside the user data main body 9 (internally added data). For example, when the user data is an mp3 file, the artist name or the like is the tag data 8. When the user data is a Word file, the information on the creator or the like is the tag data 8.

In the local path management table 402, the data ID, data hash value, duplication number, total evaluation flag, list generation number, synchronous evaluation maximum rank, local path, and fingerprint data path of each stored data item are associated with and stored for each stored data item (for each data item stored in the disk 209). Note that when the I/O request received from the client 101 is the I/O request of a block level, the physical block number is stored in place of the local path.

The duplication number means the number of duplicated stored data items. More specifically, the duplication number is the number of written data items having corresponding stored data items (to be referred to as "corresponding store data items" hereinafter) as the data contents, that is, the number written data items corresponding to the corresponding stored data items. In the example shown in FIG. 4, a stored data item having a data ID of, for example, "100" is associated with two written data items of a written data item having a global path of "/groot/user1/data1" and a written data item having a global path of "/groot/user2/data1" (see the global path management table 401). Therefore, the duplication number is "2." The total evaluation flag is the information indicating whether comparison between a corresponding stored data item and all of the other stored data items is completed or not (determination on whether these data items are the same or not). In the present example, when the comparison between the corresponding stored data item and all of the other stored data items is completed, the total evaluation flag shows "Y," and when the comparison between the corresponding stored data item and all of the other stored data items is not completed, the total evaluation flag shows "N." The list generation number is the information indicating which generation list was used as the basis for performing the synchronous de-duplication process for each corresponding stored data item. The synchronous evaluation maximum rank is the information indicating up to which rank of stored data item the comparison is completed when the synchronous de-duplication process is carried out. The fingerprint data path is a path indicating a storage destination of the fingerprint data 312.

FIG. 6 is a diagram showing an example of the full list information 311.

The full list information 311 is the information indicating, for all or part of the stored data items, a rank applied to each of the stored data items for each generation. The "rank" here means an order that is referenced when selecting a stored data item as a target of comparison performed in the de-duplication process (to be referred to as "comparison target data item" hereinafter). In the present example, the comparison target data items are selected in order of the stored data items having high ranks. Further, in the synchronous de-duplication process, a predetermined number of stored data items that are extracted in order of high ranks are obtained as comparison target data candidates (to be referred to as "comparison candidates" hereinafter), and the comparison target data items are selected from among the comparison candidates. Specifically, in the synchronous de-duplication process, the comparison candidates are restricted to a part of the stored data items (store data items with higher ranks), whereby the processing load is reduced. The number of comparison candidates may be a value that is kept by the storage server 201 in advance, or a value that is set by a manger later.

A rank is applied by the list management processing part 303. The list management processing part 303 can apply a higher rank to, for example, a stored data item that is expected to be likely to overlap. Examples of the data item that is expected to be likely to overlap include (A) data items of higher ranks (the charts, audience rating, and so on that are provided externally), (B) data items with larger duplication numbers, (C) data items that are stored recently, (D) data items with a high write/read ratio, and (E) registered data items, such as format patterns. Furthermore, the list management processing part 303 can apply a higher rank to a data item for which the effect of the de-duplication process (the effect of reducing usage of the disk 209) is great. Examples of the data for which the effect of the de-duplication process is great include data items having a large file size. The rank is updated on a regular or irregular basis, and the generation is shifted to the subsequent generation every time the rank is updated. In the present example, the lower the value of the rank is, the higher the rank is.

As shown in FIG. 6, in the full list information 311, the data ID of each stored data item, the rank applied to each stored data item, and the generation number of the generation to which the rank is applied are associated with and stored for each stored data item existing in each generation.

Figure 7:
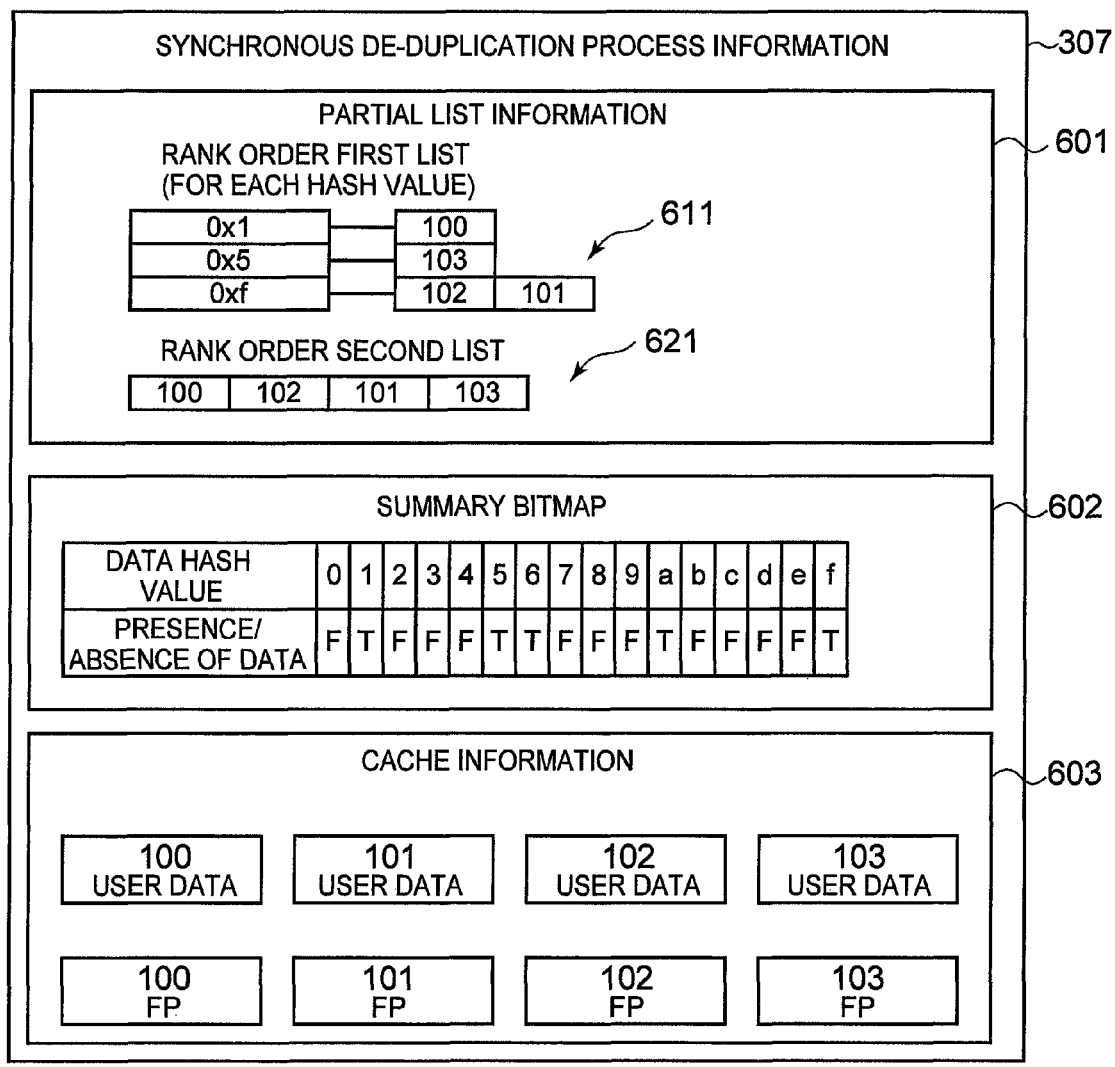
FIG. 7 is a diagram showing an example of synchronous de-duplication process information.

FIG. 7 is a diagram showing an example of the synchronous de-duplication process information 307.

The synchronous de-duplication process information 307 is the information referenced when the synchronous de-duplication process is carried out. The synchronous de-duplication process information 307 includes, for example, a partial list information 601, a summary bitmap 602, and cache information 603.

The partial list information 601 is the information that in which the comparison candidates (the data IDs of the comparison candidates) are listed in order of the ranks of the latest generations. The partial list information 601 includes a list of the comparison candidates arranged in order of the ranks for each data hash value (to be referred to as "rank order first list") 611, and a list of the comparison candidates arranged in order of the ranks with respect to the entire data hash values (to be referred to as "rank order second list") 621.

The summary bitmap 602 is the data that is referenced when immediately determining whether or not a user data item to be subjected to the synchronous de-duplication process (a user data item to be written) is a data item that does not overlap with any of the stored data items. The summary bitmap 602 has stored therein a bit value that indicates whether a stored data item to be a data hash value when a hash value is generated exists or not for each data hash value within a hash space. In the present example, when there exists the stored data item to be the data hash value, the bit value shows "T (TRUE)," and when the stored data item to be the data hash value does not exist, the bit value shows "F (FALSE)."

The cache information 603 is a copy data item of all or part of user data items (i.e., stored data items), and/or a copy data item of all or part of the fingerprint data items (described as "FP" in FIG. 7) 312, which are stored in the disk 209. As shown in FIG. 3, because the synchronous de-duplication process information 307 is stored in the memory 204, data items within the cache information 603 can be accessed at high speed. The stored data items contained in the cache information 603 may be, for example, all of the comparison candidates or a part of the comparison candidates.

Figure 8:
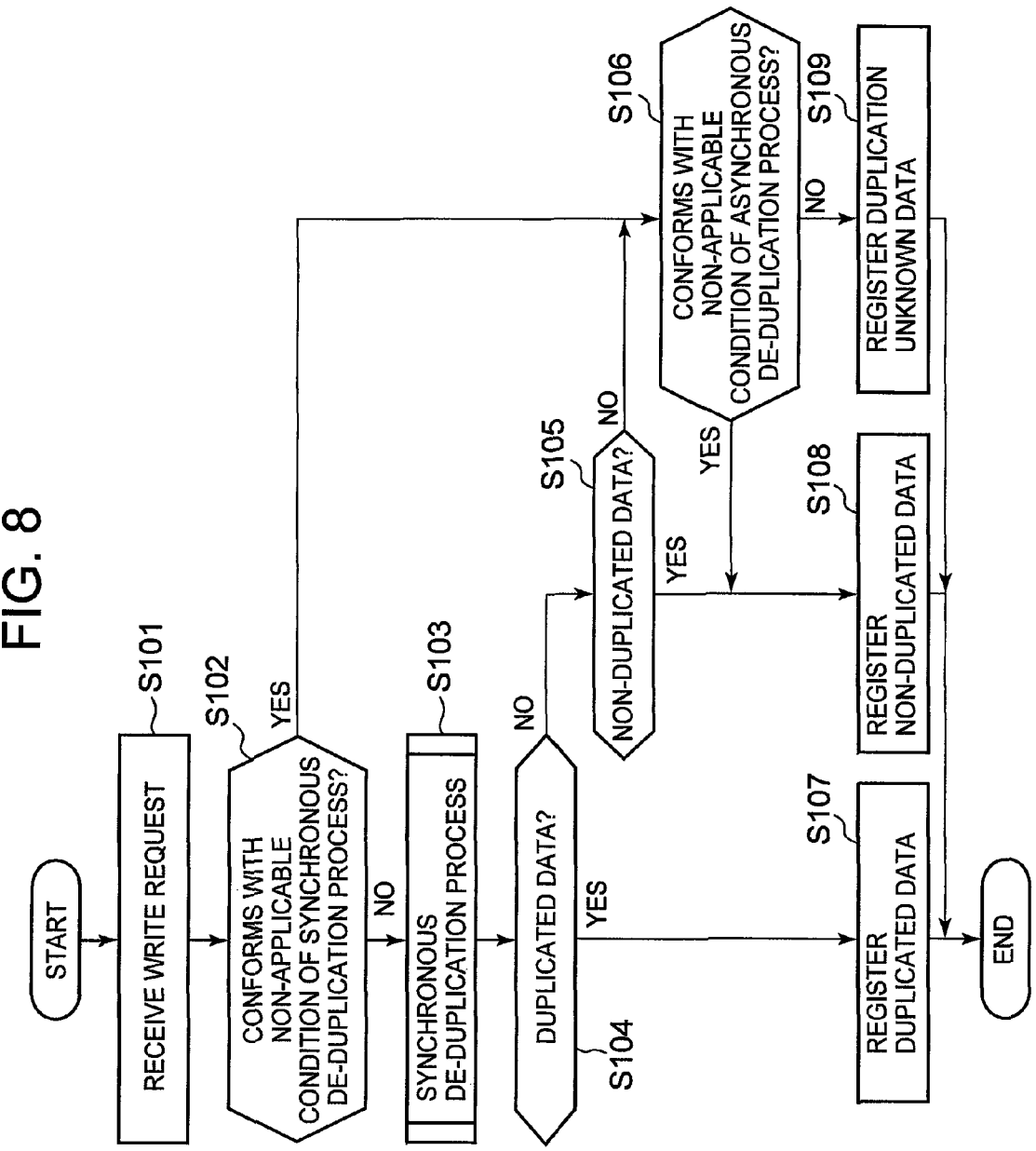
FIG. 8 is a flowchart of a process carried out by a write request processing part.

FIG. 8 is a flowchart of a process carried out by the write request processing part 306.

When the storage server 201 receives a write request from the client 101, the write request processing part 306 determines whether a user data item to be written (to be referred to as "write target data item" hereinafter) conforms with a non-applicable condition of the synchronous de-duplication process (to be referred to as "synchronous non-applicable condition" hereinafter) (S101, S102). Here, "synchronous non-applicable condition" means a condition that is used for determining whether the synchronous de-duplication process is carried out for the write target data item. In the present example, when the write target data item conforms with the synchronous non-applicable condition, the synchronous de-duplication process is not carried out for the write target data item. Examples of the synchronous non-applicable condition include a condition under which the size of the data item is large and a condition under which the write target data item is encrypted. Because it requires a certain amount of time to perform the de-duplication process on the large-size or encrypted data item, it is desired that the de-duplication process be carried out in asynchronization with the reception of the write request (in other words, the asynchronous de-duplication process is carried out).

When the write target data item conforms with the synchronous non-applicable condition (S102: YES), the process of step S106 is carried out thereafter.

On the other hand, when the write target data item does not conform with the synchronous non-applicable condition (S102: NO), the synchronous de-duplication process is carried out on the write target data item (S103). Performing the synchronous de-duplication process allows to determine whether the write target data item is a data item overlapping with (or the same as) any of the stored data items (to be referred to as "duplicated data item" hereinafter) or a data item that does not overlap with (or is not the same as) any of the stored data items (to be referred to as "non-duplicated data item" hereinafter). Note that in some cases the duplicated data item or non-duplicated data item cannot be determined by simply performing the synchronous de-duplication process. This is because the user data items that are compared with the write target data item is restricted to a part of the stored data items (comparison candidates) in the synchronous de-duplication process. In the synchronous de-duplication process, the data item that is not determined as either the duplicated data item or the non-duplicated data item (to be referred to as "duplication unknown data") is obtained as a target of a synchronous duplication determination process. The detail of the synchronous de-duplication process is described hereinafter with reference to FIGS. 9 to 11.

In the synchronous de-duplication process, when the write target data item is determined as the duplicated data item (S104: YES), the write request processing part 306 carries out a process for registering the write target data item as the duplicated data item (S107).

Specifically, the write request processing part 306 adds an entry related to the write target data item to the global path management table 401. The data ID of the added entry is the data ID of a stored data item that is determined as the same as the write target data item (to be referred to as "same data item" hereinafter). Then, the duplication number of the same data is incremented by one in the local path management table 402.

Moreover, in the synchronous de-duplication process, when it is determined that the write target data item is the duplication unknown data (S104: NO and S105: NO), the process of step S106 is carried out thereafter.

In step S106, the write request processing part 306 determines whether or not the write target data item conforms with the non-applicable condition of the asynchronous de-duplication process (to be referred to as "asynchronous non-applicable condition" hereinafter) (S106). Here, "asynchronous non-applicable condition" means a condition that is used for determining whether the asynchronous de-duplication process is carried out or not for the write target data item. In the present example, when the write target data item conforms with the asynchronous non-applicable condition, the asynchronous de-duplication process is not carried out on the write target data item. Examples of the asynchronous non-applicable condition include a condition under which the size of the data item is extremely small and a condition under which the write target data item is encrypted.

Further, in the synchronous de-duplication process, when the write target data item is determined as the non-duplicated data item (S104: NO but S105: YES), or when the write target data item conforms with the asynchronous non-applicable condition (S106: YES), the write request processing part 306 carries out a process for registering the write target data item as the non-duplicated data item (S108).

Specifically, first, the write target data item is stored in the disk 209 and the data ID is allocated to this stored data item. The write request processing part 306 then changes the bit value corresponding to the data hash value of the write target data item in the summary bitmap 602 to "TRUE." The write request processing part 306 further adds entries related to the write target data item to the global path management table 401 and the local path management table 402, respectively.

The data IDs of the entry added to the global path management table 401 (to be referred to as "global addition entry" hereinafter) and the entry added to the local path management table 402 (to be referred to as "local addition entry" hereinafter) are the data ID allocated to the write target data item stored in the disk 209. The global path of the global addition entry is a global path indicating the destination for storing the write target data item therein. The local path of the local addition entry is a local path indicating the destination for storing the write target data item therein. The duplication number of the local addition entry is "1," and the total evaluation flag of the local addition entry is "Y." The list generation number of the local addition entry is the latest generation number at the point of time when the synchronous de-duplication process is carried out and the synchronous evaluation maximum rank of the local addition entry is the lowest rank out of the ranks applied to the comparison target data items (the stored data items that are target of comparison performed during the synchronous de-duplication process). Note that when the fingerprint data 312 related to the write target data item is present, the fingerprint data 312 also is stored in the disk 209. The fingerprint data path of the local addition entry is a path indicating the destination for storing the fingerprint data 312 related to the write target data item.

In the determination process of step S106, when the write target data item does not conform with the asynchronous non-applicable condition (S106: NO), the write request processing part 306 carries out a process for registering the write target data item as the duplication unknown data item (S109). The process of S109 is the same as the process of S108 except for the following points. Specifically, when the write target data item is the duplication unknown data item, the total evaluation flag of the local addition entry is described as "N."

Figure 9:
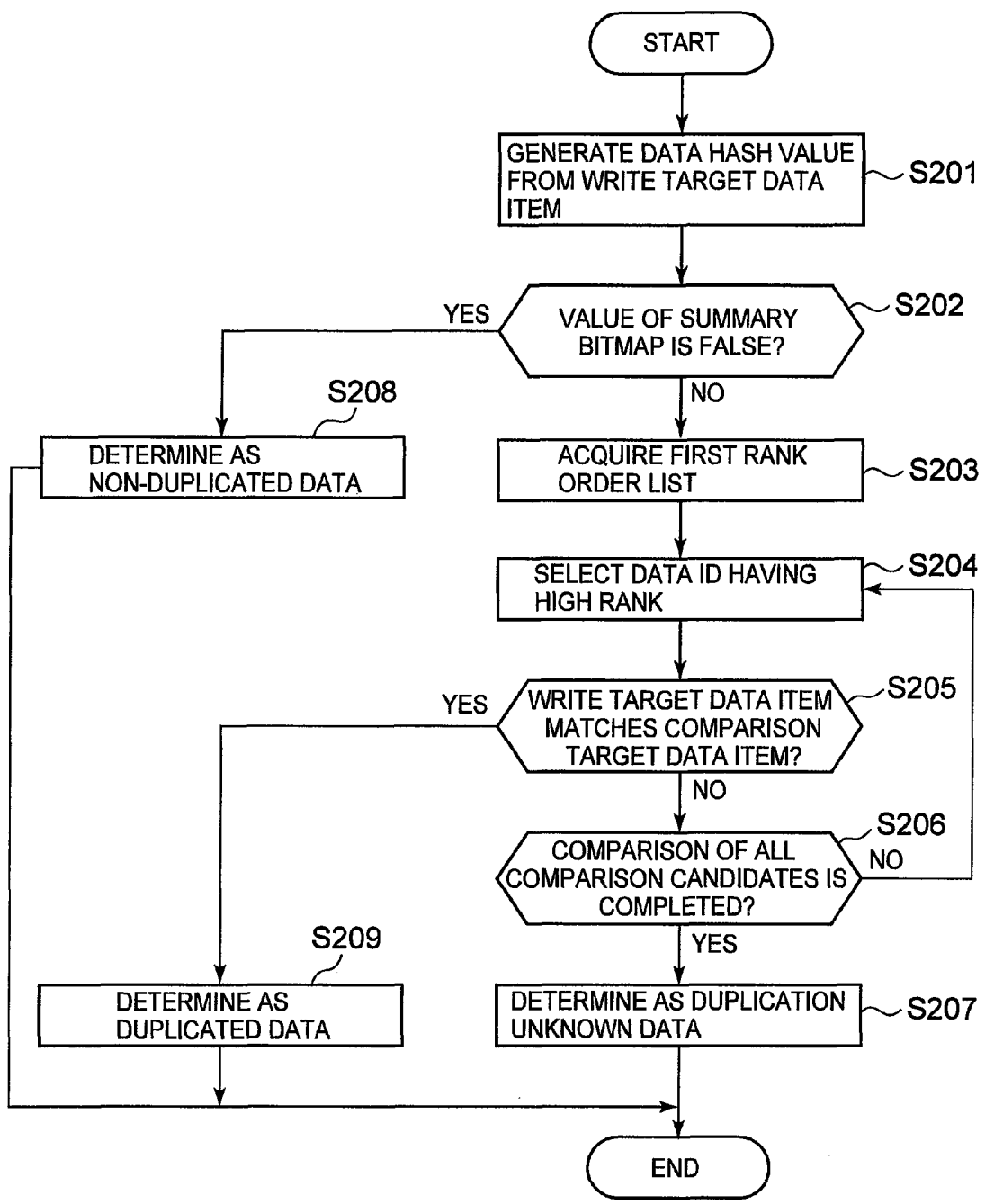
FIG. 9 is a flowchart of the synchronous de-duplication process using a complete matching system.

FIG. 9 is a flowchart of the synchronous de-duplication process using a complete matching system.

Figure 10:
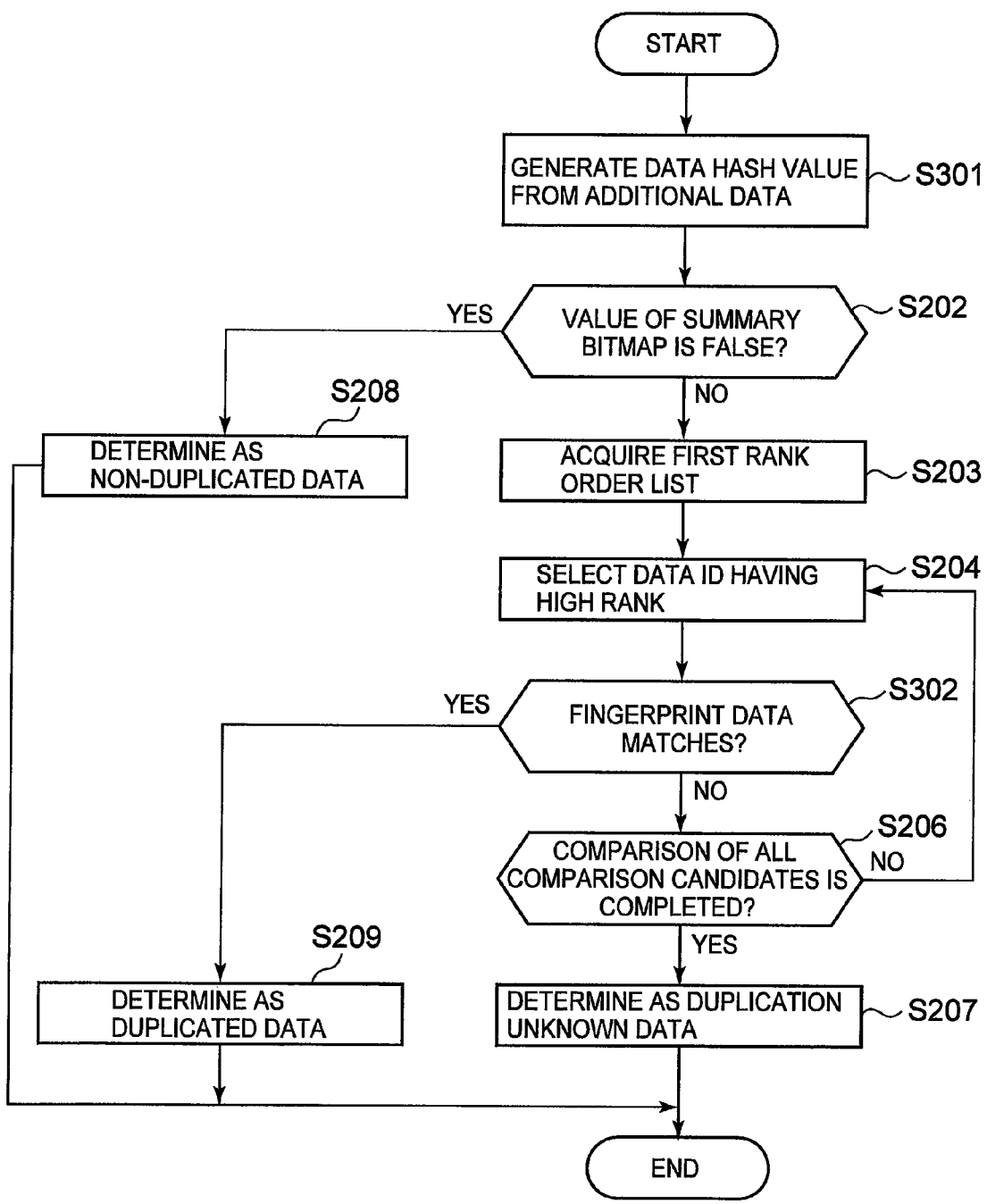
FIG. 10 is a flowchart of the synchronous de-duplication process using a first non-complete matching system.
Figure 11:
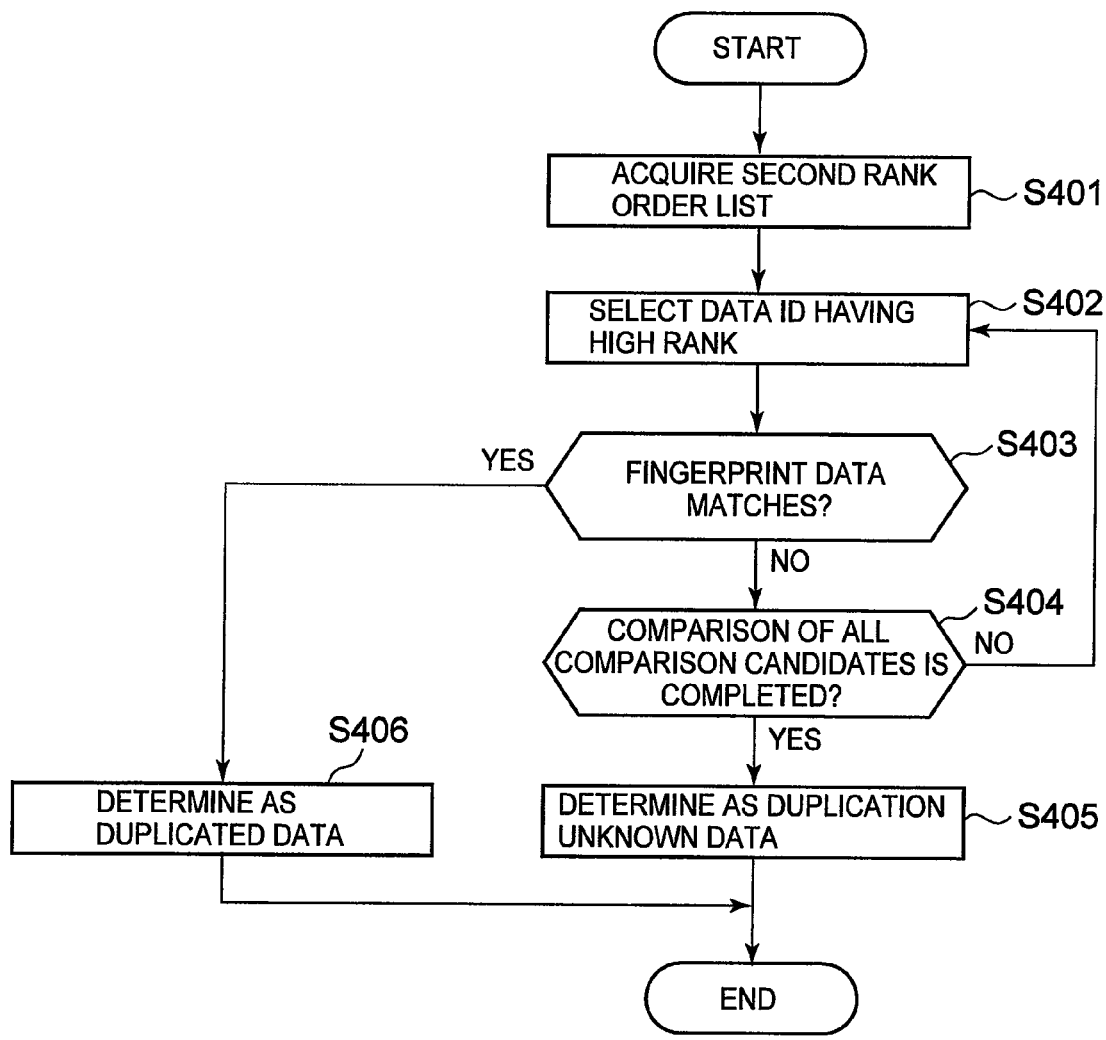
FIG. 11 is a flowchart of the synchronous de-duplication process using a second non-complete matching system.

The processes shown in FIGS. 9 to 11 are performed in step S103 shown in FIG. 8. When the complete matching system is employed, the process shown in FIG. 9 is carried out. When the non-complete matching system is employed, the process shown in FIG. 10 or FIG. 11 is carried out.

First, the synchronous de-duplication processing part 301 generates the data hash value from the write target data item (S201). Hereinafter, the data hash value generated in this step S201 is called "target hash value."

Next, the synchronous de-duplication processing part 301 determines whether the bit value corresponding to the target hash value in the summary bitmap 602 is "FALSE" or not (S202).

When the bit value corresponding to the target hash value is "FALSE" (S202: YES), the synchronous de-duplication processing part 301 determines that the write target data item as the non-duplicated data item. Specifically, in this case, the write target data item is immediately determined as the non-duplicated data item, without being subjected to the comparison with the stored data items. This is because it is clear that there is no stored data item having the same data hash value, since the bit value corresponding to the target hash value is "FALSE." In other words, the same stored data item does not exist.

On the other hand, when the bit value corresponding to the target hash value is "TRUE" (S202: NO), the synchronous de-duplication processing part 301 acquires the rank order first list related to the target hash value, from the partial list information 601 (S203). For example, in the example shown in FIG. 7, when the target hash value is "0x0f," the rank order first list having the data IDs of "102" and "101" is acquired. The stored data items that have the data IDs included in the rank order first list acquired in this step S203 are the comparison candidates.

Thereafter, the synchronous de-duplication processing part 301 selects the data ID of the highest rank from among the data IDs included in the rank order first list acquired in step S203 (besides the stored data items that are already compared with the write target data item) (S204). The stored data item having the data ID selected in this step S204 is taken as the comparison target data item.

Thereafter, the synchronous de-duplication processing part 301 compares the write target data item with the comparison target data item and determines whether the both data items are the same or not (whether the data contents of these data items completely match or not) (S205). When the comparison target data item is included in the cache information 603, the comparison target data item within the cache information 603 is used to determine whether the write target data item and the comparison target data item are the same or not. As a result, compared to the case in which the comparison target data item is read from the disk 209 to perform the comparison, the comparison process can be performed at high speed. When, on the other hand, the comparison target data item is not included in the cache information 603, the comparison target data item is read from the disk 208, and the read comparison target data item is used to determine whether the write target data item and the comparison target data item are the same or not. Note that when comparing the data items, determination on whether the fingerprint data 312 related to the both data items matches or not may be performed as a preprocessing for comparing the entire data items. When supposedly the fingerprint data 312 related to the both data items does not match, it can be determined without comparing the entire data items that the both data items are not the same.

When it is determined that the write target data item and the comparison target data item are the same (S205: YES), the synchronous de-duplication processing part 301 determines that the write target data item as the duplicated data item (S209).

When, on the other hand, it is determined that the write target data item and the comparison target data item are not the same (S205: NO), the synchronous de-duplication processing part 301 determines whether the comparison with all of the comparison candidates is completed of not (S206).

When the comparison of all of the comparison candidates is not completed (S206: NO), the synchronous de-duplication processing part 301 selects the data ID of the next highest rank (S204), and uses the stored data item having the selected data ID as the comparison target data item, to compare it with the write target data item.

On the other hand, when the comparison of all of the comparison candidates is completed (S206: YES), the synchronous de-duplication processing part 301 determines the write target data item as the duplication unknown data item (S207).

FIG. 10 is a flowchart of the synchronous de-duplication process using a first non-complete matching system.

The synchronous de-duplication process using the first non-complete matching system is carried out when the non-complete matching system is employed, and is particularly a process that is carried out when data items that are likely to overlap can be narrowed down to some extent by referring the additional data.

The steps other than steps S301 and S302 of the process shown in FIG. 10 (the steps applied with the same reference numerals as with those in FIG. 9) are substantially the same as those of the process shown in FIG. 9. The main differences with FIG. 9 will be described hereinafter.

In step S301, the synchronous de-duplication processing part 301 generates the data hash value from the additional data. In step S302, the synchronous de-duplication processing part 301 compares the fingerprint data 312 related to the write target data item with the fingerprint data 312 related to the comparison target data item, and determines whether the write target data item is same as the comparison target data item (whether or not it can be determined that the both data items are substantially the same). Specifically, when the fingerprint data 312 related to the write target data item matches the fingerprint data 312 related to the comparison target data item, the synchronous de-duplication processing part 301 determines that the write target data item is the same as the comparison target data item. Note that when the fingerprint data 312 related to the write target data item not completely matches the fingerprint data 312 related to the comparison target data item but matches the fingerprint data 312 related to the comparison target data item in more than the probability of a certain extent, it may be determined that the write target data item is the same as the comparison target data item.

FIG. 11 is a flowchart of the synchronous de-duplication process using a second non-complete matching system.

The synchronous de-duplication process of the second non-complete matching system is carried out when the non-complete matching system is employed, and is particularly a process that is carried out when it is difficult refer to the additional data to narrow down, to some extent, data items that are likely to overlap.

First, the synchronous de-duplication processing part 301 acquires the rank order second list from the partial list information 601 (S401). The stored data items that have the data IDs included in the rank order second list acquired in this step S401 are taken as the comparison candidates.

Next, the synchronous de-duplication processing part 301 selects the data ID of the highest rank from among the data IDs (besides the stored data items of which fingerprint data 312 is already compared with the fingerprint data 312 related to the write target data item) included in the rank order second list acquired in step S401 (S402). The stored data item having the data ID selected in this step S402 is taken as the comparison target data item.

Thereafter the synchronous de-duplication processing part 301 compares the fingerprint data 312 related to the write target data item with the fingerprint data 312 related to the comparison target data item, and determines whether or not the write target data item is the same as the comparison target data item (whether it can be determined that the both data items are substantially the same) (S403). Specifically, when the fingerprint data 312 related to the write target data item matches the fingerprint data 312 related to the comparison target data, the synchronous de-duplication processing part 301 determines that the write target data item is the same as the comparison target data item. Note that when the fingerprint data 312 related to the write target data item not completely matches the fingerprint data 312 related to the comparison target data item but matches the fingerprint data 312 related to the comparison target data item in more than the probability of a certain extent, it may be determined that the write target data item is the same as the comparison target data item.

When it is determined that the write target data item is the same as the comparison target data item (S403: YES), the synchronous de-duplication processing part 301 determines the write target data item as the duplicated date item (S406).

When, on the other hand, it is determined that the write target data item is not the same as the comparison target data item (S403: NO), the synchronous de-duplication processing part 301 determines whether the comparison of all of the comparison candidates is completed or not (S404).

When the comparison of all of the comparison candidates it not completed (S404: NO), the synchronous de-duplication processing part 301 selects the data ID of the next highest rank (S402), and uses the stored data item having the selected data ID as the comparison target data item, to compare it with the write target data item.

On the other hand, when the comparison of all of the comparison candidates is completed (S404: YES), the synchronous de-duplication processing part 301 determines that the write target data item as the duplication unknown data item (S405).

Figure 12:
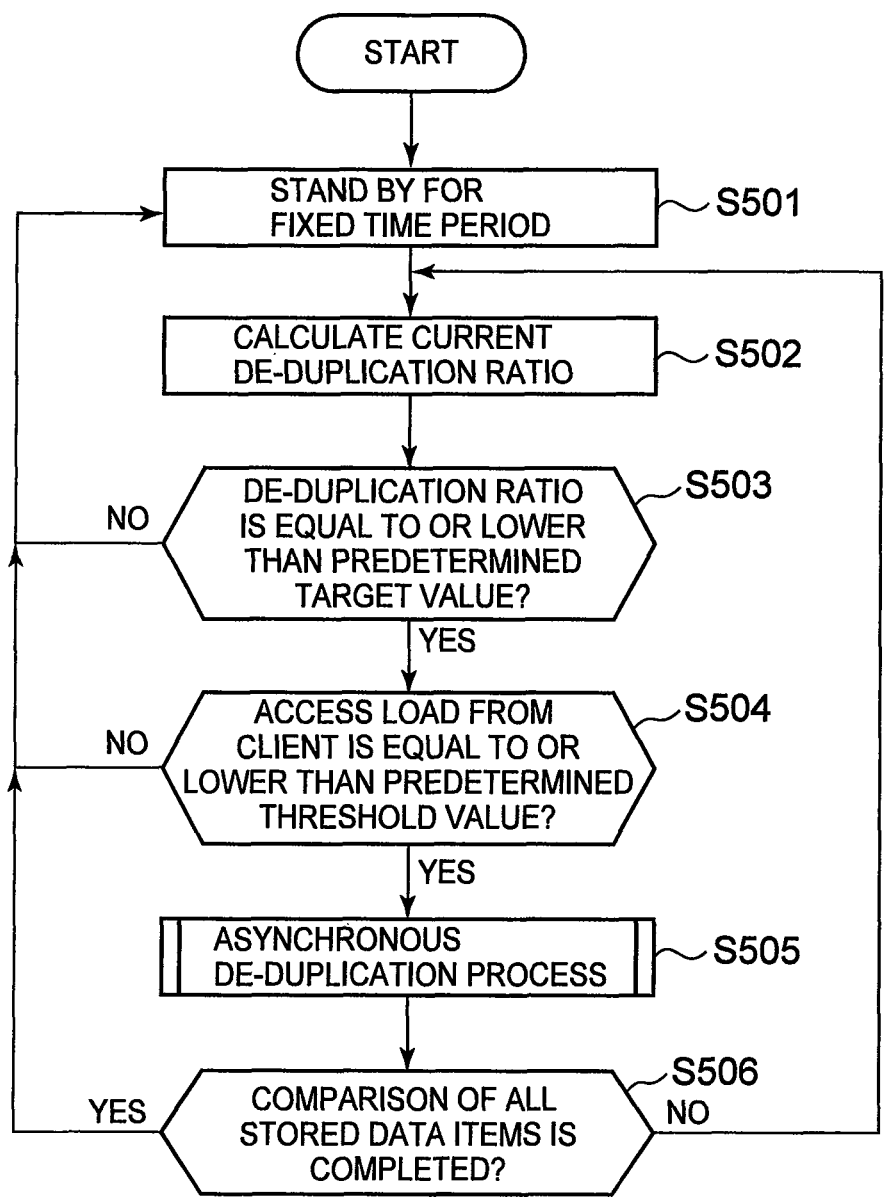
FIG. 12 is a flowchart of a first monitoring process.

FIG. 12 is a flowchart of a first monitoring process.

The first monitoring process is carried out by the monitor processing part 304 to determine whether the asynchronous de-duplication process is executed or not. The monitor processing part 304 can perform the first monitoring process at an appropriate time, and an example in which the first monitoring process is carried out on a regular basis (for example, every several hours or every several weeks) is described hereinafter.

After standing by for a fixed time period (for example, for a several hours, several weeks, or the like) (S501), the monitor processing part 304 computes the current de-duplication ratio (S502). Here, "de-duplication ratio" is a value indicating how much of duplication storage is eliminated, and is particularly represented by a ratio of the number of duplicated data items subjected to de-duplication (i.e., duplicated data items that are prevented from being stored in the disk 209 or deleted from the disk 209) to the number of duplicated data items that exist at a certain point of time. For example, the de-duplication ratio is 100% when all of the duplicated data items are eliminated, and 0% when none of the duplicated data items is eliminated. The monitor processing part 304 can compute the de-duplication ratio based on, for example, the global path management table 401 and the local path management table 402.

Next, the monitor processing part 304 determines whether the de-duplication ratio computed in step S502 is equal to or lower than a predetermined target value (to be referred to as "de-duplication target value" hereinafter) (S503).

When the de-duplication ratio is greater than the de-duplication target value (S503: NO), the asynchronous duplication processing is not carried out, and the monitor processing part 304 stands by for a fixed time period (S501).

When, on the other hand, the de-duplication ratio is equal to or lower than the de-duplication target value (S503: YES), the monitor processing part 304 determines whether or not an access load generated from the client 101 (a value indicating an access load calculated from the CPU usage, I/O amount, or the like) is equal to or lower than a predetermined threshold value (to be referred to as "access load threshold value" hereinafter) (S504).

When the access load is greater than the access load threshold value (S504: NO), the asynchronous duplication processing is not carried out, and the monitor processing part 304 stands by for the fixed time period (S501).

On the other hand, when the access load is equal to or lower than the access load threshold value (S504: YES), the asynchronous de-duplication processing part 302 carries out the asynchronous de-duplication process (S505). Specifically, when the de-duplication ratio is somewhat low and the access load is low, the asynchronous de-duplication process is performed. The detail of the synchronous de-duplication process is explained hereinafter with reference to FIGS. 13 and 14.

After the asynchronous de-duplication process is performed, the monitor processing part 304 determines whether or not comparison of all of the other stored data items (determination on whether all of the other stored data items are the same or not) is completed for each of all of the stored data items (in other words, whether there is no longer any stored data items having the total evaluation flag of "N" in the local management table 402) (S506).

When the comparison of all of the other stored data items is not completed for each of all of the stored data items (S506: NO), the monitor processing part 304 carries out the processes of steps S502 to S505 again.

When, on the other hand, the comparison of all of the other stored data items is completed for each of all of the stored data items (S506: YES), the monitor processing part 304 stands by for the fixed time period thereafter (S501).

Figure 13:
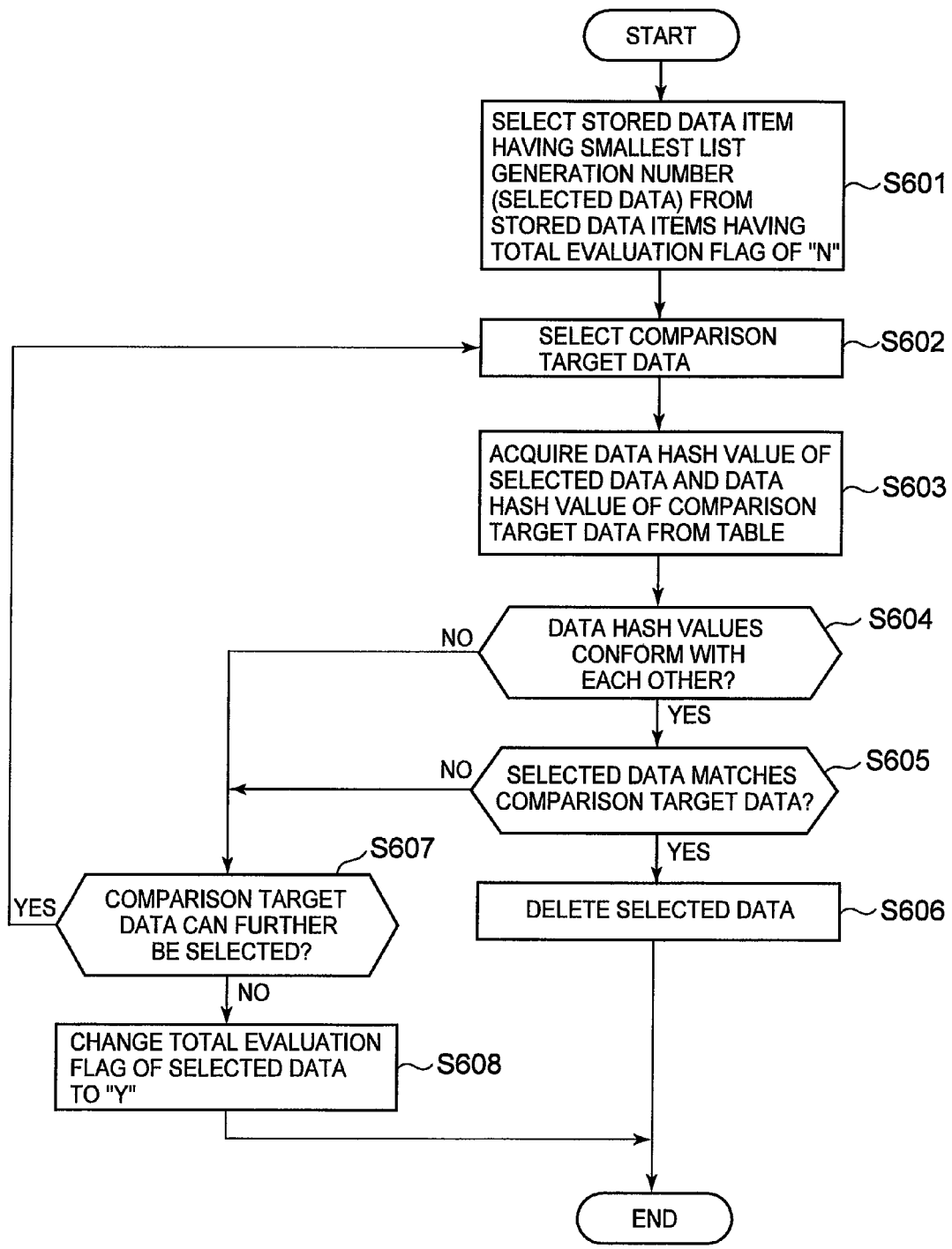
FIG. 13 is a flowchart of an asynchronous de-duplication process using the complete matching system.

FIG. 13 is a flowchart of the asynchronous de-duplication process using the complete matching system.

First, the asynchronous de-duplication processing part 302 refers to the local path management table 402 to select one stored data item having the smallest list generation number, from among the stored data items having the total evaluation flag of "N" (S601). Hereinafter, the stored data item selected in this step S601 is called "selected data item." In addition, the list generation number of the selected data item is called "selected generation number," and the synchronous evaluation maximum rank of the selected data item is called "selected rank."

Next, the asynchronous de-duplication processing part 302 selects the comparison target data item (S602). Specifically, the asynchronous de-duplication processing part 302 refers to the full list information 311 to select one entry, whose list generation umber is the selected generation number and whose rank is larger than the selected rank. The stored data item that has the data ID of the entry selected in this step S602 is obtained as the comparison target data item. In the examples shown in FIGS. 4 and 6, the stored data item having the data ID of "300" with the total evaluation flag of "N" is obtained as the selected data item (see FIG. 4). Therefore, the selected generation number is "2," and the selected rank is "4" (see FIG. 4). Accordingly, the stored data item having the data ID of "104," which is the stored data item having the list generation number of "2" and the rank of "4" or greater, is obtained as the comparison target data item (see FIG. 6).

Next, the asynchronous de-duplication processing part 302 acquires the data hash values of the selected data item and the data hash values of the comparison target data item (S603).

Thereafter, the asynchronous de-duplication processing part 302 determines whether or not the data hash value of the selected data item matches the hash value of the comparison target data item (S604).

When the both data hash values do not match (S604: NO), the process of step S608 is performed thereafter.

When, on the other hand, the both hash values match (S604: YES), the asynchronous de-duplication processing part 302 compares the selected data item with the comparison target data item to determine whether the both data items are the same or not (whether the data contents of these data items completely match or not) (S605).

When it is determined that the selected data item is not the same as the comparison target data item (S605: NO), the process of step S607 is performed thereafter.

When it is determined that the selected data item is the same as the comparison target data item (S605: YES), the asynchronous de-duplication processing part 302 carries out a process for deleting the selected data item from the disk 209 (S606). More specifically, the asynchronous de-duplication processing part 302 changes the data ID of the written data item corresponding to the selected data item on the global path management table 401 to the data ID of the comparison target data item. Moreover, the asynchronous de-duplication processing part 302 increments the duplication number of the comparison target data item on the local path management table 402 by 1. The asynchronous de-duplication processing part 302 then deletes the selected data item and the fingerprint data 312 related to the selected data item from the disk 209. The asynchronous de-duplication processing part 302 deletes the entry of the selected data item from the local path management table 402.

In step S607, it is determined whether or not the comparison target data item can further be selected. When the comparison target data item can be further selected (S607: YES), the processes following step S602 are carried out again.

On the other hand, when the comparison target data item cannot be further selected (S607: NO), the asynchronous de-duplication processing part 302 changes the total evaluation flag of the selected data item on the local path management table 402 to "Y" (S608).

Figure 14:
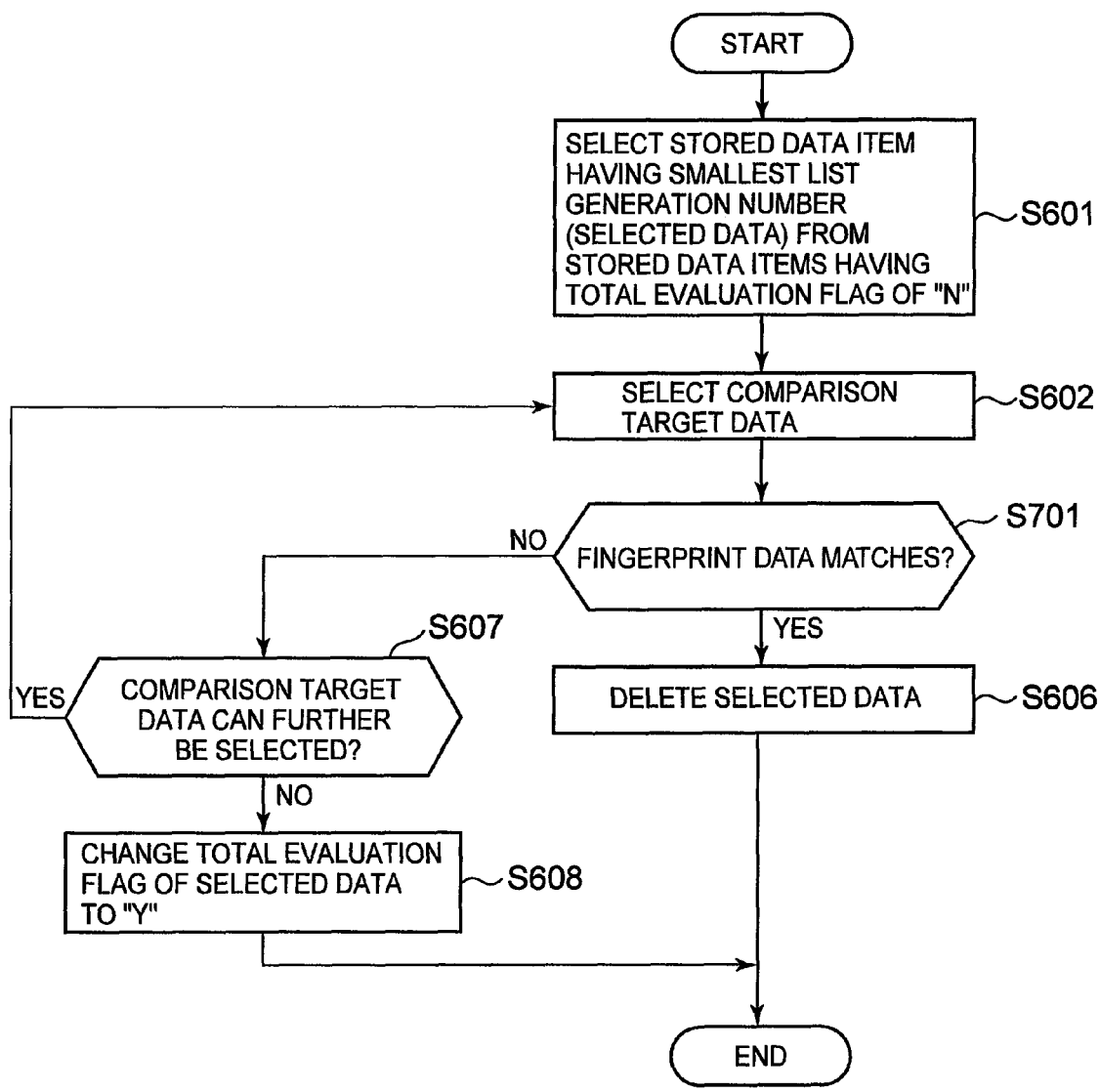
FIG. 14 is a flowchart of the asynchronous de-duplication process using a non-complete matching system.

FIG. 14 is a flowchart of the asynchronous de-duplication process using the non-complete matching system.

In the process shown in FIG. 14, the steps applied with the same reference numerals as with those of FIG. 13 are substantially the same as the process shown in FIG. 13. In other words, in the process shown in FIG. 14, step S701 is performed in place of steps S603 to S605 shown in FIG. 13.

In step S701, the asynchronous de-duplication processing part 302 compares the fingerprint data 312 related to the selected data item with the fingerprint data 312 related to the comparison target data item, and determines whether the selected data item is the same as the comparison target data item or not (whether it can be determined that the both data items are substantially the same). More specifically, when the fingerprint data 312 related to the selected data item matches the fingerprint data 312 related to the comparison target data item, the asynchronous de-duplication processing part 302 determines that the selected data item is the same as the comparison target data item. Note that when the fingerprint data 312 related to the selected data item not completely matches the fingerprint data 312 related to the comparison target data item but matches the fingerprint data 312 related to the comparison target data item in more than the probability of a certain extent, it may be determined that the selected data item is the same as the comparison target data item.

Figure 15:
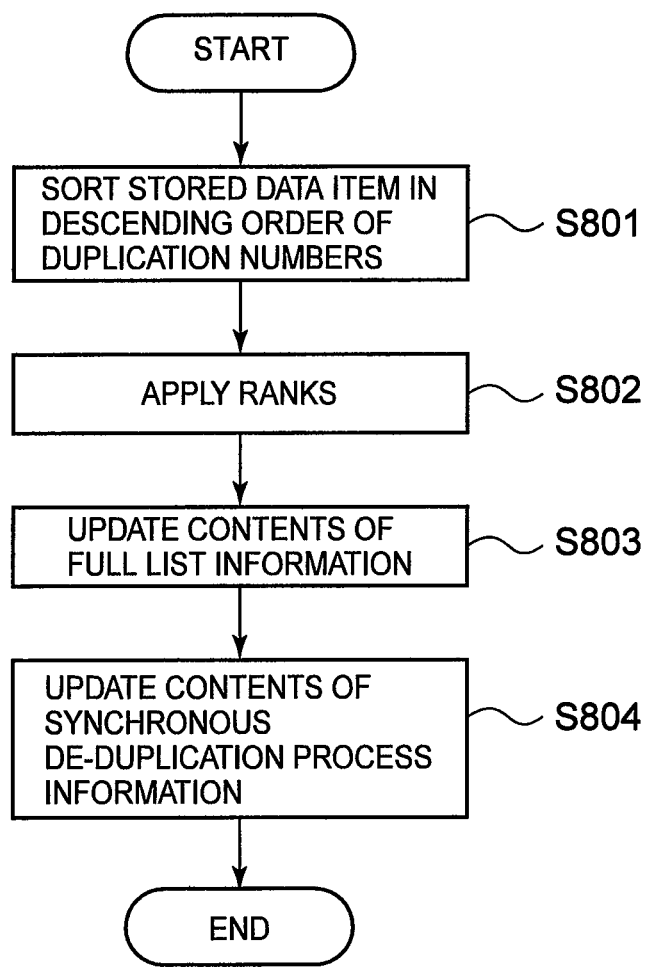
FIG. 15 is a flowchart of a rank update process.

FIG. 15 is a flowchart of a rank update process.

The rank update process is executed on a regular or irregular basis. As the ranks are updated, the contents of the full list information 311 and the synchronous de-duplication process information 307 are updated.

As described above, the ranks are determined based on, for example, the degree of the possibility of duplication and the greatness of the effect attained from the de-duplication process. In the present example, the ranks are determined based on the duplication number.

First, the list management processing part 303 sorts the stored data items managed by the local path management table 402, in descending order of the duplication number (S801).

Subsequently, the list management processing part 303 applies ranks to the stored data items sorted in step S801, by applying higher ranks to the greater duplication numbers (S802).

Thereafter, the list management processing part 303 registers the information related to the new ranks applied in step S802, to the full list information 311 (S803). Specifically, the list management processing part 303 adds to the full list information 311 an entry combining the data IDs of the stored data items and the new ranks applied to the stored data items, for each of the stored data items. In so doing, the list generation number is the number indicating a new generation (the number obtained by adding 1 to the current list generation number).

The list management processing part 303 then updates the contents of the synchronous de-duplication process information 307 (the partial list information 601 and the cache information 603) in accordance with the contents of the updated full list information 311 (the order of the ranks of the latest generations) (S804).

Figure 16:
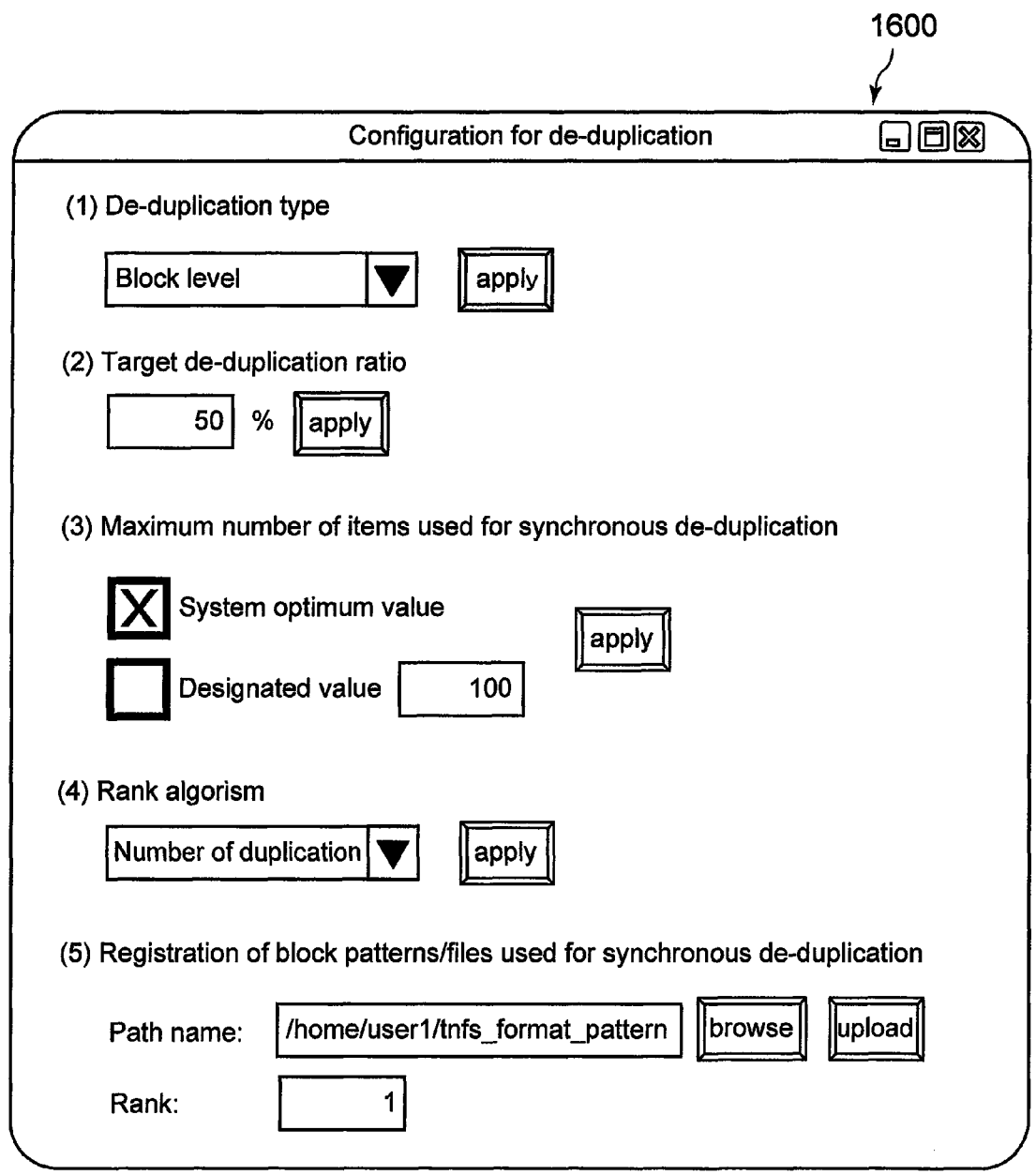
FIG. 16 is a diagram showing an example of a setting screen used for performing the de-duplication process.

FIG. 16 is a diagram showing an example of a setting screen 1600 used for performing the de-duplication process.

As shown in this diagram, the setting screen 1600 used for performing the de-duplication process is provided with input fields (1) to (5), for example.

The input field (1) is a field for setting a process type of the de-duplication process. Examples of the process type include whether the I/O request received from the client 101 is the I/O request of a block level or the I/O request of a file level, and whether the system for determining whether the data items are the same or not is the complete matching system or the non-complete matching system. The input field (2) is a field for setting the de-duplication target value. The input field (3) is a field for setting the number of comparison candidates (the number of stored data items to be compared in the synchronous de-duplication process). The input field (4) is a field for setting a reference used when applying the ranks (e.g., the size of each duplication number, etc.). The input field (5) is a field for inputting a data pattern that is referenced when applying the ranks (format pattern, etc.).

Figure 17:
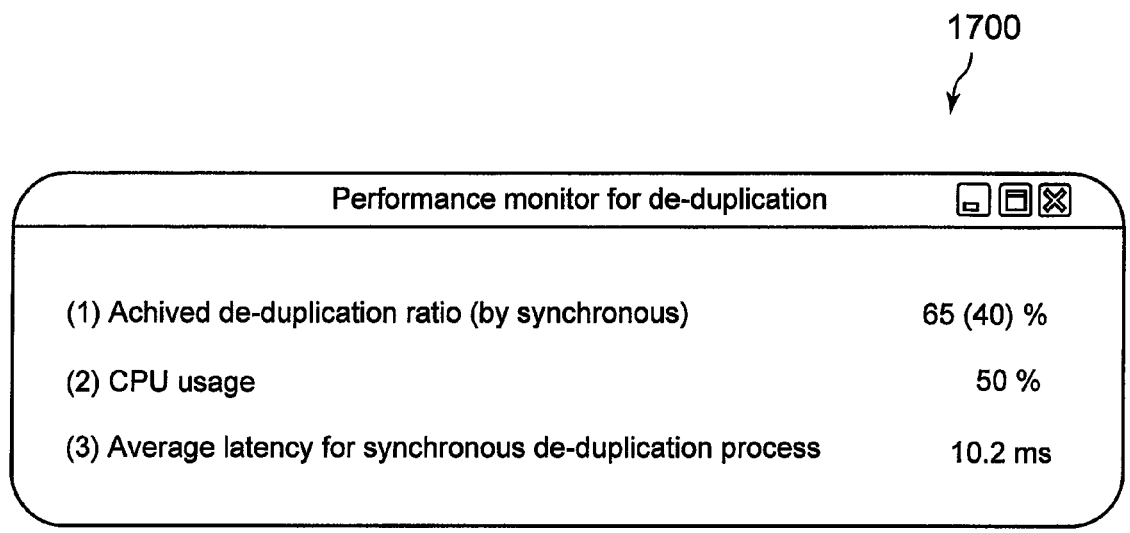
FIG. 17 is a diagram showing an example of a monitor.

FIG. 17 is a diagram showing an example of a monitor 1700.

The monitor 1700 is a screen for displaying the information on the de-duplication process (processing results, etc.). The monitor 1700 is provided with display fields (1) to (3), for example.

The display field (1) is a field for displaying the current de-duplication ratio. The numerical values in parentheses shown in FIG. 17 are the de-duplication ratios obtained during a single synchronous de-duplication process. The display field (2) is a field for displaying the usage of the CPU 202. When the usage of the CPU 202 is excessively high, the manager can change, for example, the de-duplication target value or the configuration of the storage system 103 (by providing, for example, a plurality of storage servers 201, as described in Example 2). The display field (3) is a field for displaying the average value of processing times required in the synchronous de-duplication process. When this value is excessively large, the manager can, for example, reduce the number of comparison candidates or change the configuration of the storage system 103.

Example 2

Figure 18:
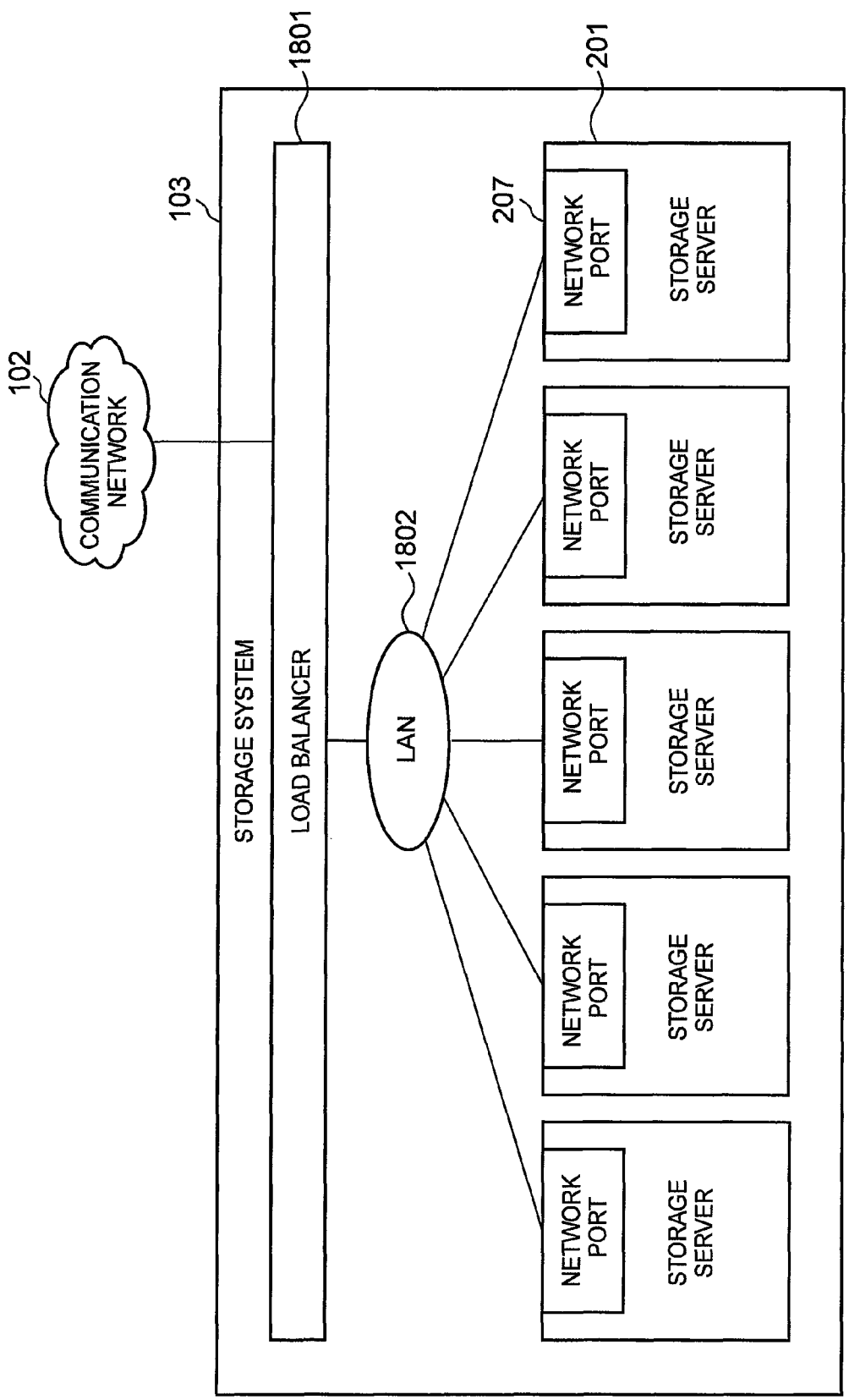
FIG. 18 is a diagram showing a configuration example of a storage system according to Example 2.

FIG. 18 is a diagram showing a configuration example of the storage system 103 according to Example 2.

As shown in this diagram, in Example 2, the storage system 103 is provided with the plurality of storage servers 201. The hardware configuration of an individual storage server 201 is substantially the same as the one described in Example 1 (the one shown in FIG. 2). Each of the plurality of storage servers 201 is coupled to a load balancer 1801 by, for example, a LAN (Local Area Network) 1802. The load balancer 1801 is coupled the communication network 102.

Figure 19:
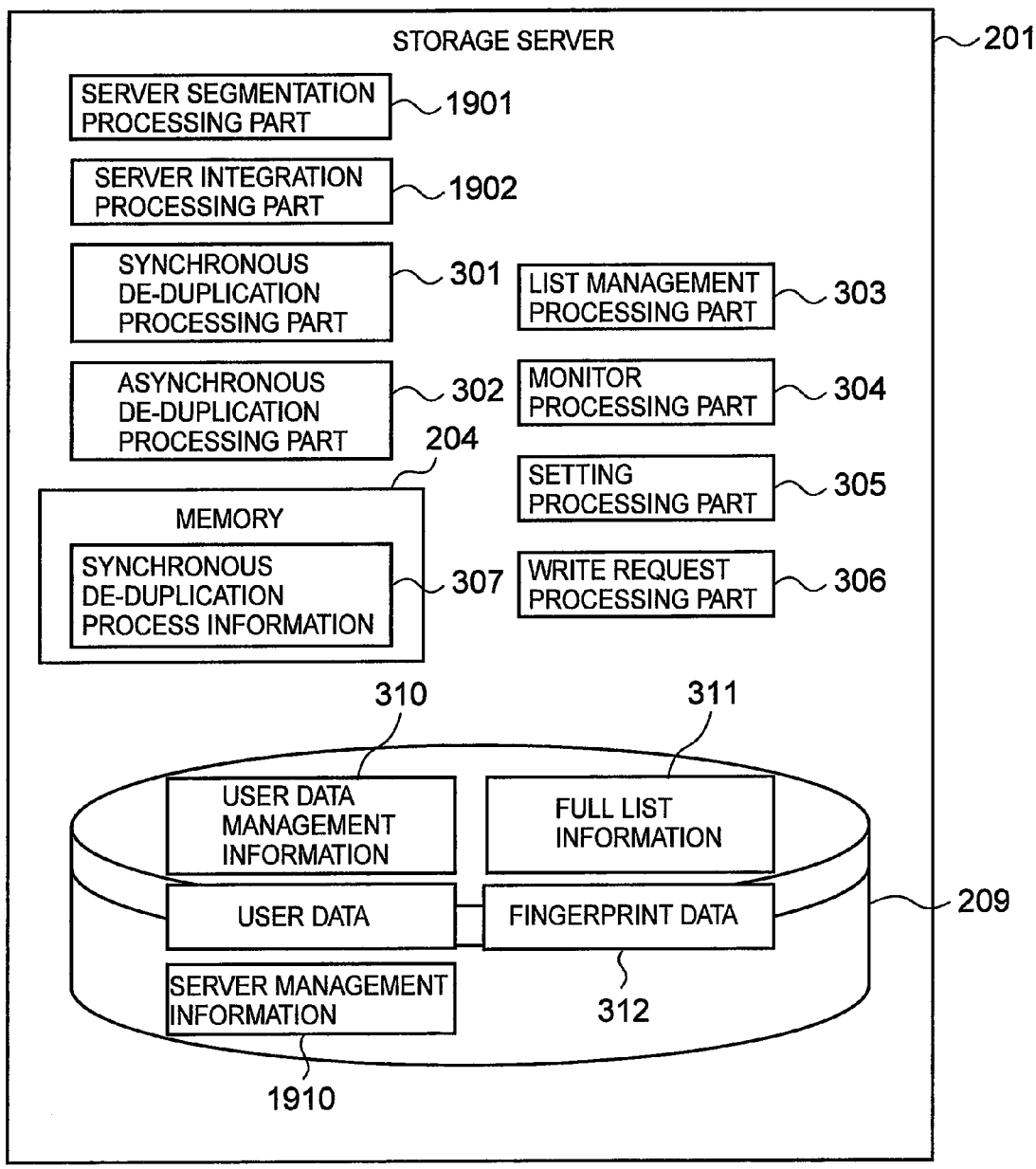
FIG. 19 is a diagram showing a software configuration example of a storage server according to Example 2.

FIG. 19 is a diagram showing a software configuration of each storage server 201 according to Example 2.

The storage server 201 according to Example 2 is provided with the processing parts 301 to 306 that are the same as those of Example 1. In addition, the information 307, 310, 311 and the data 312 that are the same as those of Example 1 are stored in the memory 204 or disk 209 of the storage server 201 according to Example 2.

In Example 2, the storage server 201 is further provided with a server segmentation processing part 1901 and a server integration processing part 1902. The disk 209 further has server management information 1910 stored therein.

Figure 20:
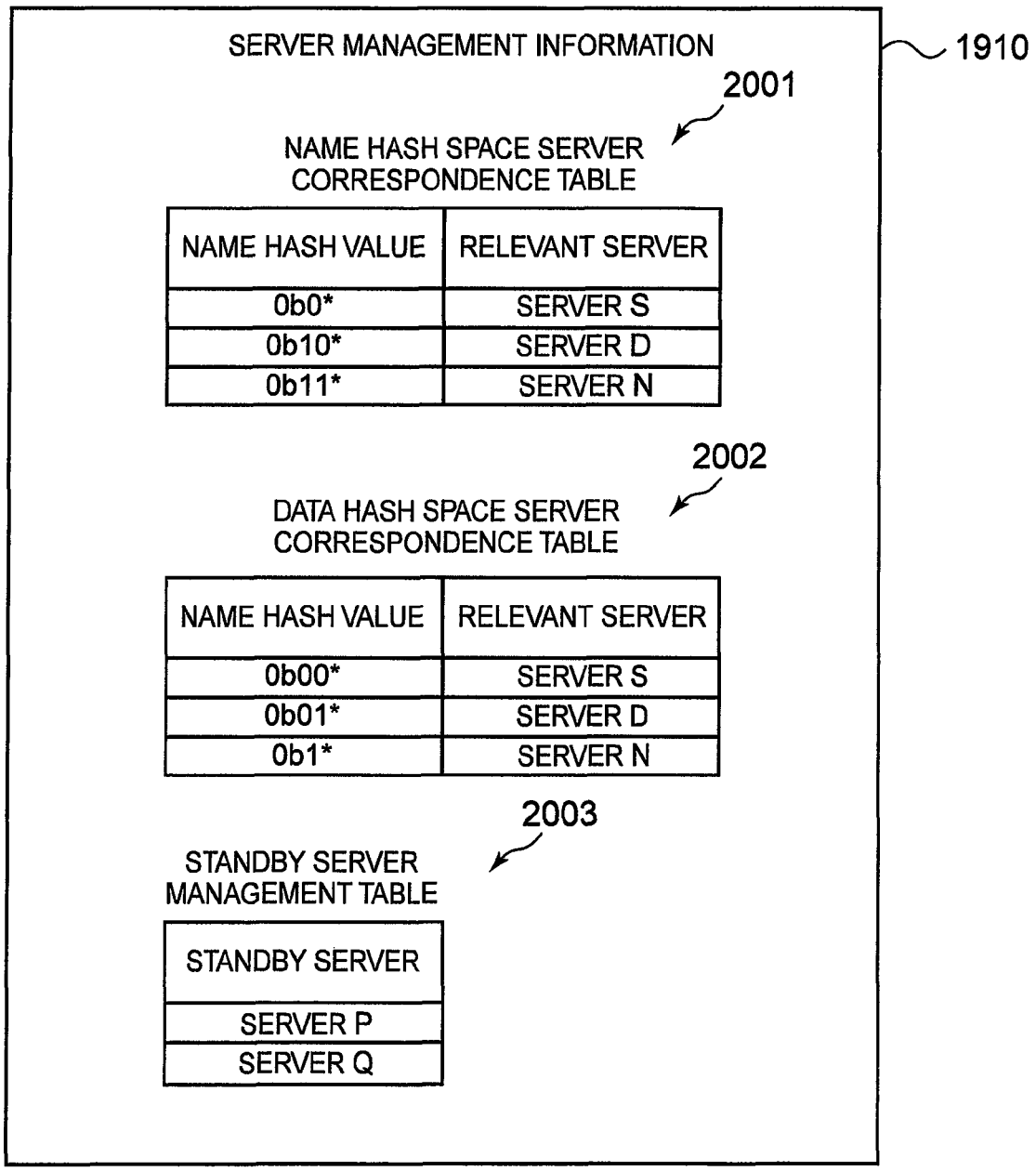
FIG. 20 is a diagram showing an example of server management information.

FIG. 20 is a diagram showing an example of the server management information 1910.

The server management information 1910 has, for example, a name hash space server correspondence table 2001, a data hash space server correspondence table 2002, and a standby server management table 2003.

The name hash space server correspondence table 2001 is a table showing the correspondence relationship between a space (name hash space) of the name hash value (the hash value generated from the global path) and the server 201 that manages (stores in the disk 209) the path name (character string) of the global path included in the name hash space (hash value to be generated is contained in the name hash space). For example, when the name hash value having a global path of "/groot/user1/data" is "0b00001111," it is understood by referring to the table 2001 of FIG. 20 that the server 201 managing the path name "/groot/user1/data" is a server S.

the data hash space server correspondence table 2002 is a table showing the correspondence relationship between a space (data hash space) of the data hash value (the hash value generated from the user data or additional data) and the server 201 that manages (stores in the disk 209) the user data contained in the data hash space (hash value to be generated is contained in the data hash space). For example, when the data hash value of certain user data is "0b11110000," it is understood by referring to the table 2002 of FIG. 20 that the server 201 managing the user data is a server N.

The standby server management table 2003 is a table showing the server 201 that is in a standby state (to be referred to as "standby server" hereinafter), out of the storage servers 201 provided in the storage system 103. The standby management table 2003 is referenced when a server segmentation process or a server integration process is carried out, as will be described hereinafter.

Figure 21:
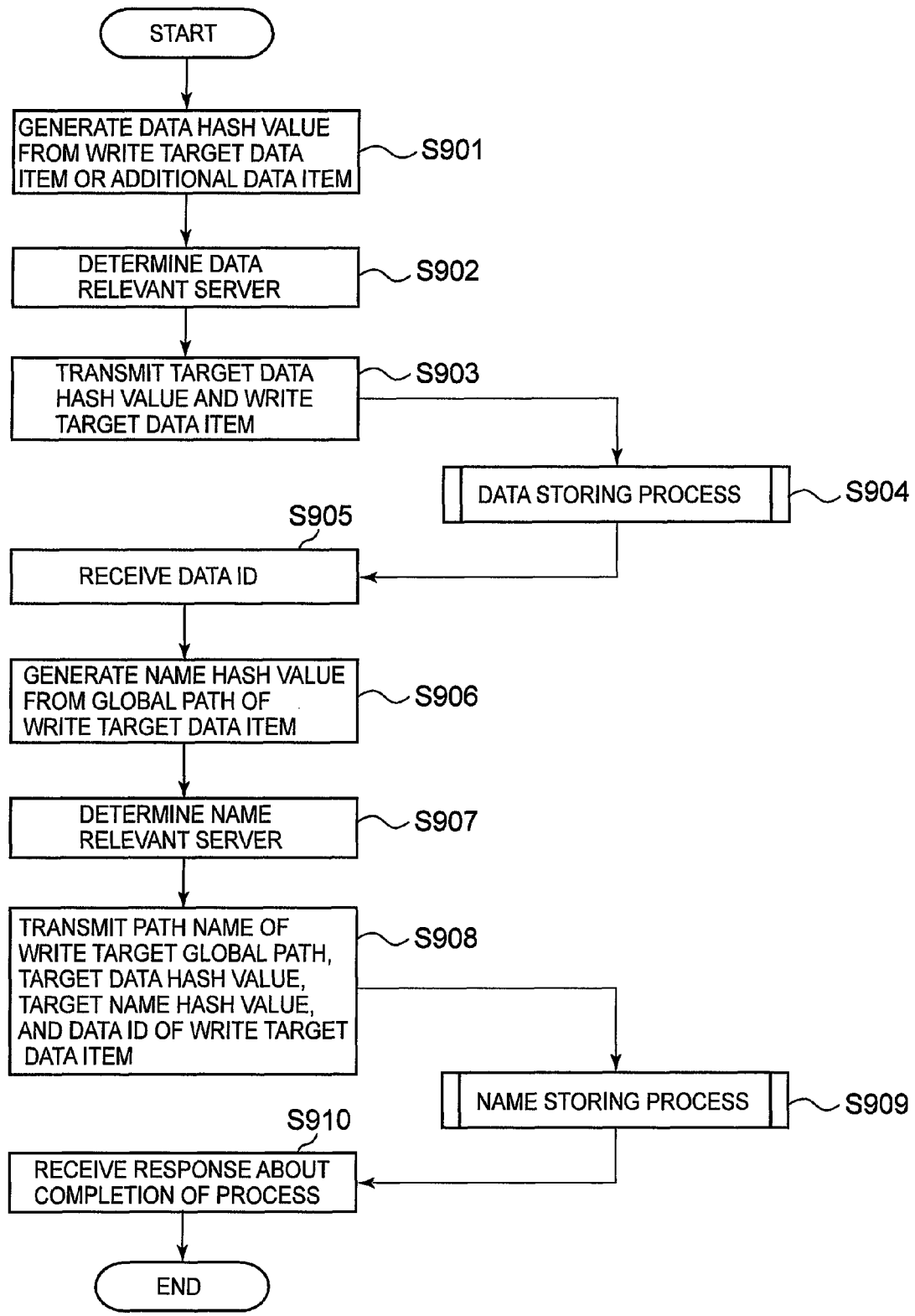
FIG. 21 is a flowchart of a process carried out by a write request processing part according to Example 2.

FIG. 21 is a flowchart of a process carried out by the write request processing part 306 according to Example 2.

The write request processing part 306 of the storage server 201 that has received the write request (to be referred to as "request receiving server" hereinafter) generates the data hash value from the write target data item or the additional data item (S901). The data hash value is generated from the write target data item when the complete matching system is employed, or from the additional data when the non-complete matching system is employed. Hereinafter, the data hash value generated in this step S901 is called "target data hash value."

Next, the write request processing part 306 refers to the data hash space server correspondence table 2002, and determines the storage server 201 managing the write target data item (to be referred to as "data server" hereinafter), based on the target data hash value (S902).

The write request processing part 306 thereafter transmits the target data hash value and the write target data item to the data server 201 determined in step S902 (S903).

The data server 201 that has received the target data hash value and the write target data item carries out a process for storing the write target data item into the disk 209 (to be referred to as "data storing process" hereinafter) (S904). The detail of the data storing process is described hereinafter with reference to FIG. 22.

When the process of step S904 is completed, the request receiving server 201 receives, from the data server 201, the data ID applied to the write target data item (S905).

The write request processing part 306 of the request receiving server 201 then generates the name hash value from the global path of the write target data item (to be referred to as "write target global path" hereinafter) (S906). Hereinafter, the name hash value generated in this step S906 is called "target name hash value."

Next, the write request processing part 306 refers to the name hash space server correspondence table 2001 to determine the storage server 201 managing the path name of the write target global path (to be referred to as "name server" hereinafter), based on the target name hash value (S907).

The write request processing part 306 thereafter transmits, to the name server 201 determined in step S907, the path name of the write target global path, target data hash value, target name hash value, and data ID of the write target data item (S908).

The name server 201 that has received the path name of the write target global path, target data hash value, target name hash value, and data ID of the write target data item carries out a processing for storing the path name of the write target global path into the disk 209 (to be referred to as "name storing process" hereinafter) (S909). The detail of the name storing process is described hereinafter with reference to FIG. 24.

When the request receiving server 201 receives a response about the completion of the process from name server 201 (S910), the present process is ended.

Figure 22:
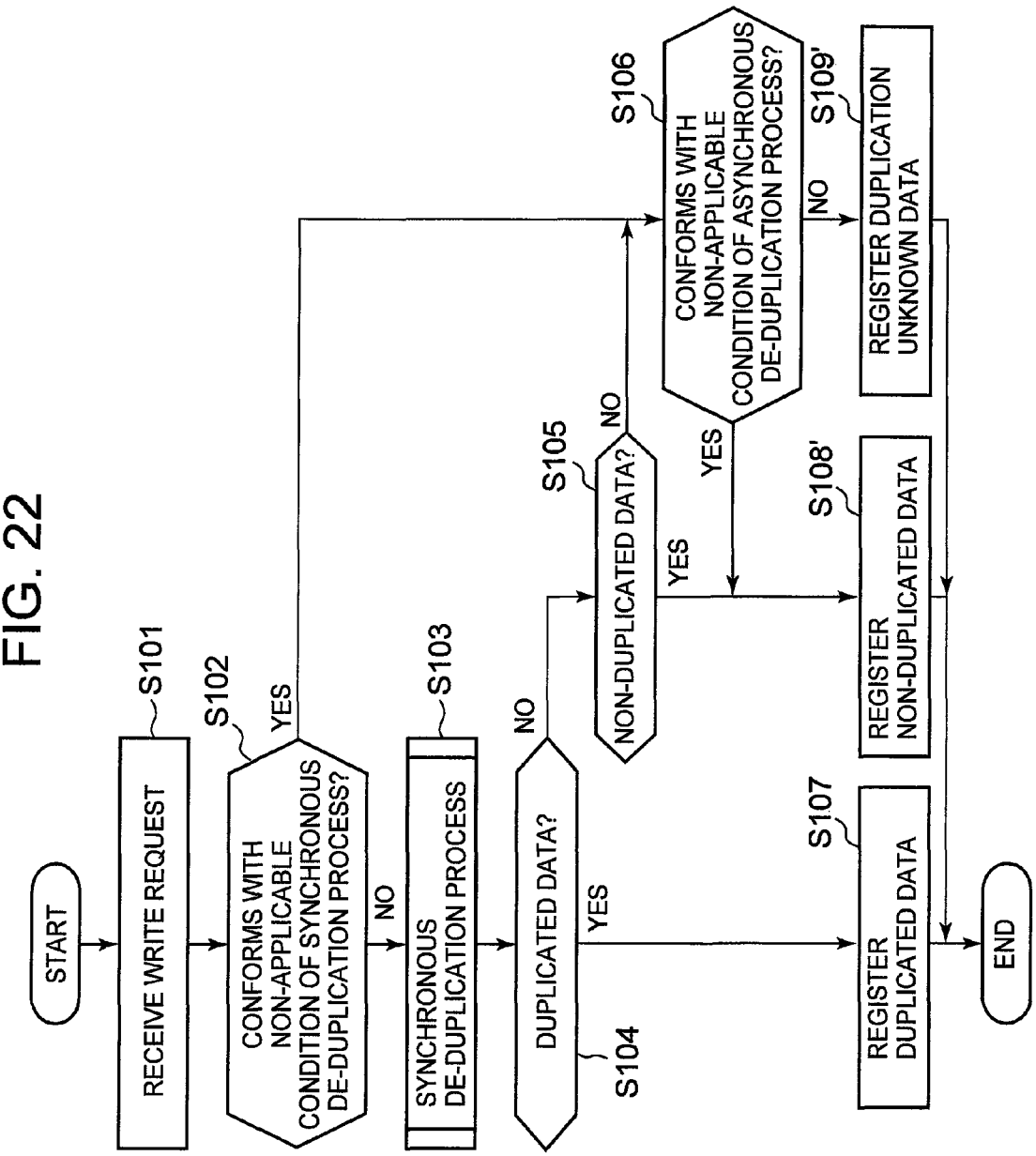
FIG. 22 is a flowchart of a data storing process carried out by a data server.

FIG. 22 is a flowchart of the data storing process carried out by the data server 201.

The process shown in FIG. 22 is substantially the same as the processes in Example 1 which are shown in FIGS. 8 to 11, except for steps S108' and 109'. The processes other than step S103 in FIG. 22 are carried out by the write request processing part 306 of the data server 201, and the process of step S103 in FIG. 22 (the process shown in each of FIGS. 9 to 11) is carried out by the synchronous de-duplication processing part 301 of the data server 201.

Figure 23:
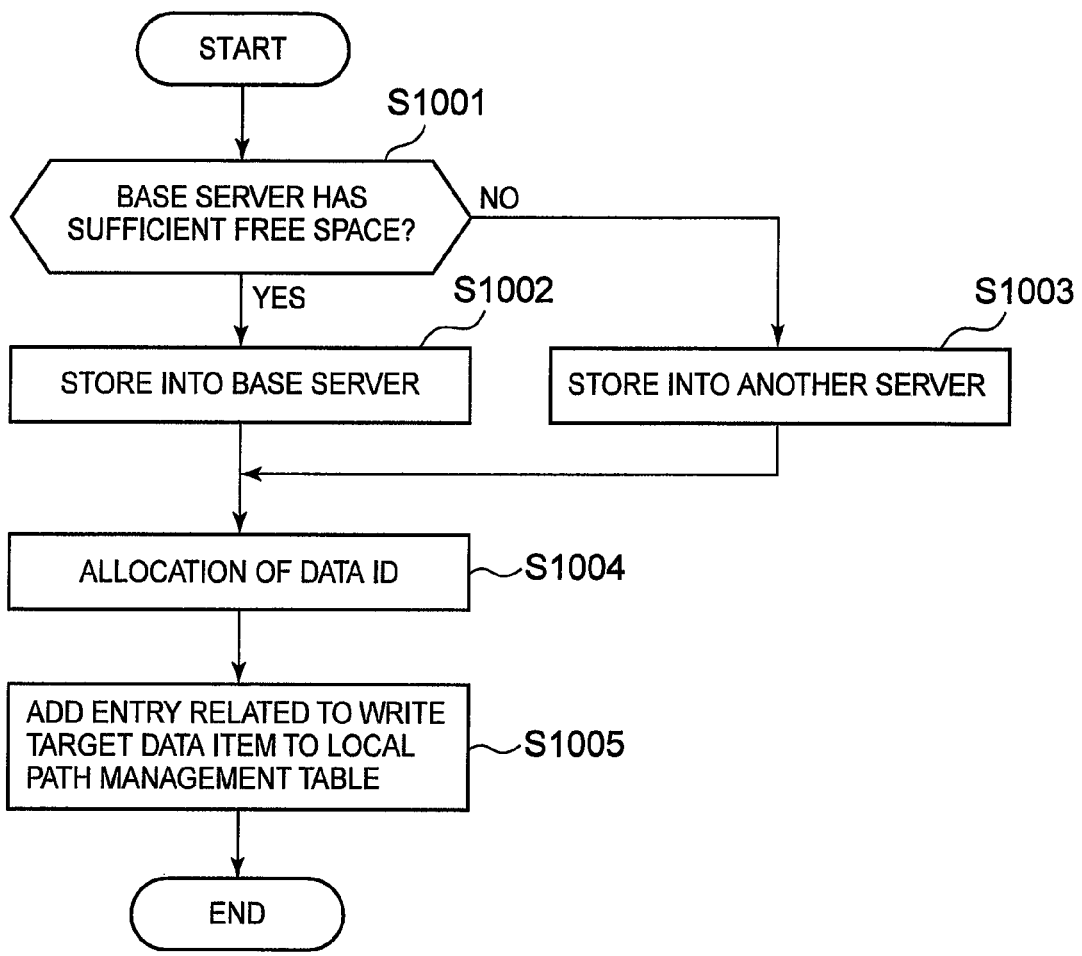
FIG. 23 is a flowchart of a non-duplicated data or duplication unknown data registration process according to Example 2.
Figure 24:
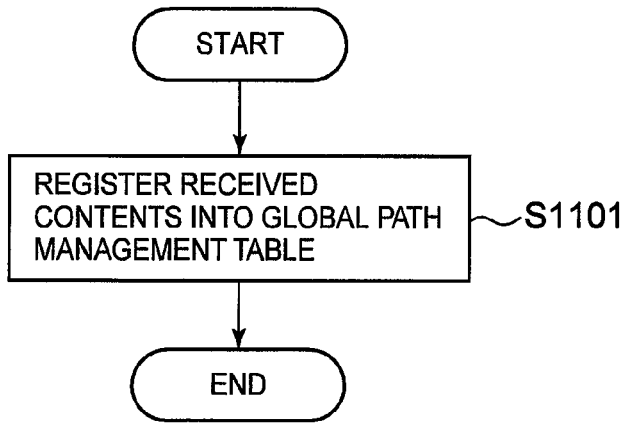
FIG. 24 is a flowchart of a name storing process carried out by a name server.

Step S108' is a process for registering the non-duplicated data item, and step S109' a process for registering the duplication unknown data item. In Example 2, because the plurality of storage servers 201 are provided, it is desired that the usage of the disks 209 of the plurality of storage servers 201 be balanced. The processes of steps S108' and S109' are as shown in FIG. 24. Hereinafter, these processes are described with reference to FIG. 23.

First, the write request processing part 306 of the data server 201 confirms whether the disk 209 of a base server 201 has a sufficient free space (S1001).

When the base server 201 has a sufficient free space (S1001: YES), the write target data item is stored in the base server 201 (S1002).

When, on the other hand, the base server 201 does not have a sufficient free space (S1001: NO), the write target data item is stored in another server 201 having enough free space (S1003).

When the write target data item is stored in the disk 209, the data ID is allocated to the write target data item (S1004). The data ID allocated to the write target data item may be a unique value per hash space, or a value unique to the entire storage system 103. In the case of the unique value per hash space, the user data is specified by a combination of the data hash value and the data ID.

Subsequently, the write request processing part 306 adds an entry related to the write target data item, to the local path management table 402 (S1005). In the case of the non-duplicated data, the total evaluation flag is "Y." In the case of the duplication unknown data, the total evaluation flag is "N."

Note that the asynchronous de-duplication process is executed in Example 2 as well. The asynchronous de-duplication process executed in Example 2 is substantially the same as that of Example 1 (FIGS. 12 to 14).

FIG. 24 is a flowchart of the name storing process carried out by the name server 201.

The name server 201 that has received the path name of the write target global path, target data hash value, target name hash value, and data ID of the write target data registers the received contents into the global path management table 401 (S1101).

Figure 25:
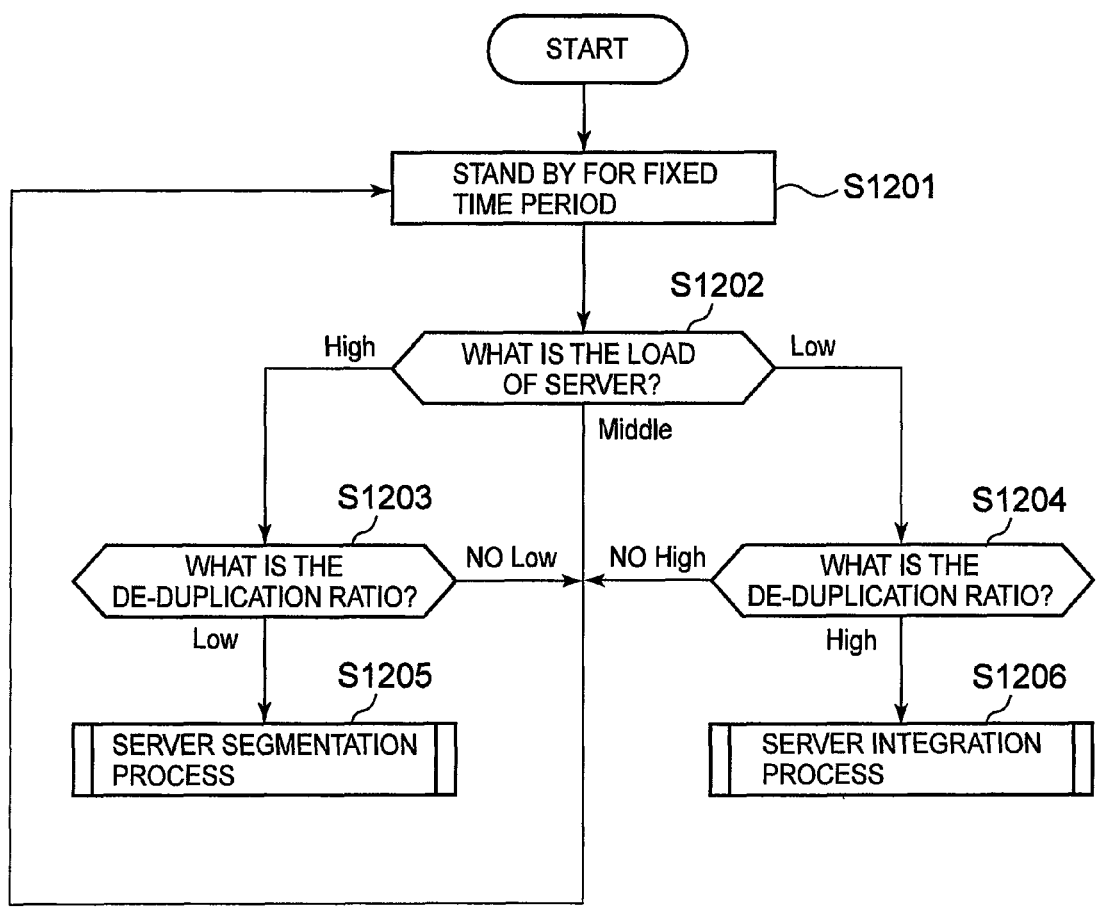
FIG. 25 is a flowchart of a second monitoring process.

FIG. 25 is a flowchart of a second monitoring process.

The second monitoring processing is a process carried out by the monitor processing part 304 in order to determine whether the server segmentation process or the server integration process is carried out. As with the first monitoring process, the monitor processing part 304 can carryout the second monitoring process at an appropriate time, but an example of carrying out the second monitoring process on a regular basis (for example, every several hours or every several weeks) is described hereinafter.

After standing by for a fixed time period (for several hours or several weeks, for example) (S1201), the monitor processing part 304 calculates the load on the storage server 201 to determine the level of the load on the storage server 201 (S1202).

When it is determined that the load on the storage server 201 is appropriate (S1202: Middle), the monitor processing part 304 stands by for the fixed time period again (S1201).

On the other hand, when it is determined that the load on the storage server 201 is high or lower (S1202: High or Low), the de-duplication ratio is calculated, and the level of the de-duplication ratio is determined (S1203, S1204).

When it is determined that the load on the storage server 201 is high and the de-duplication ratio is low (S1203: Low), the server segmentation process is executed (S1205). The detail of the server segmentation process is described hereinafter with reference to FIG. 26.

When it is determined that the load on the storage server 201 is low and the de-duplication ratio is high (S1204: High), the server integration process is executed (S1206). The detail of the server integration process is described hereinafter with reference to FIG. 27.

When it is determined that the load on the storage server 201 is high and the de-duplication ratio is high or moderate (S1203: NO Low), or when it is determined that the load on the storage server 201 is low and the de-duplication ratio is low or moderate (S1204: NO High), the monitor processing part 304 stands by for the fixed time period again (S1201).

Figure 26:
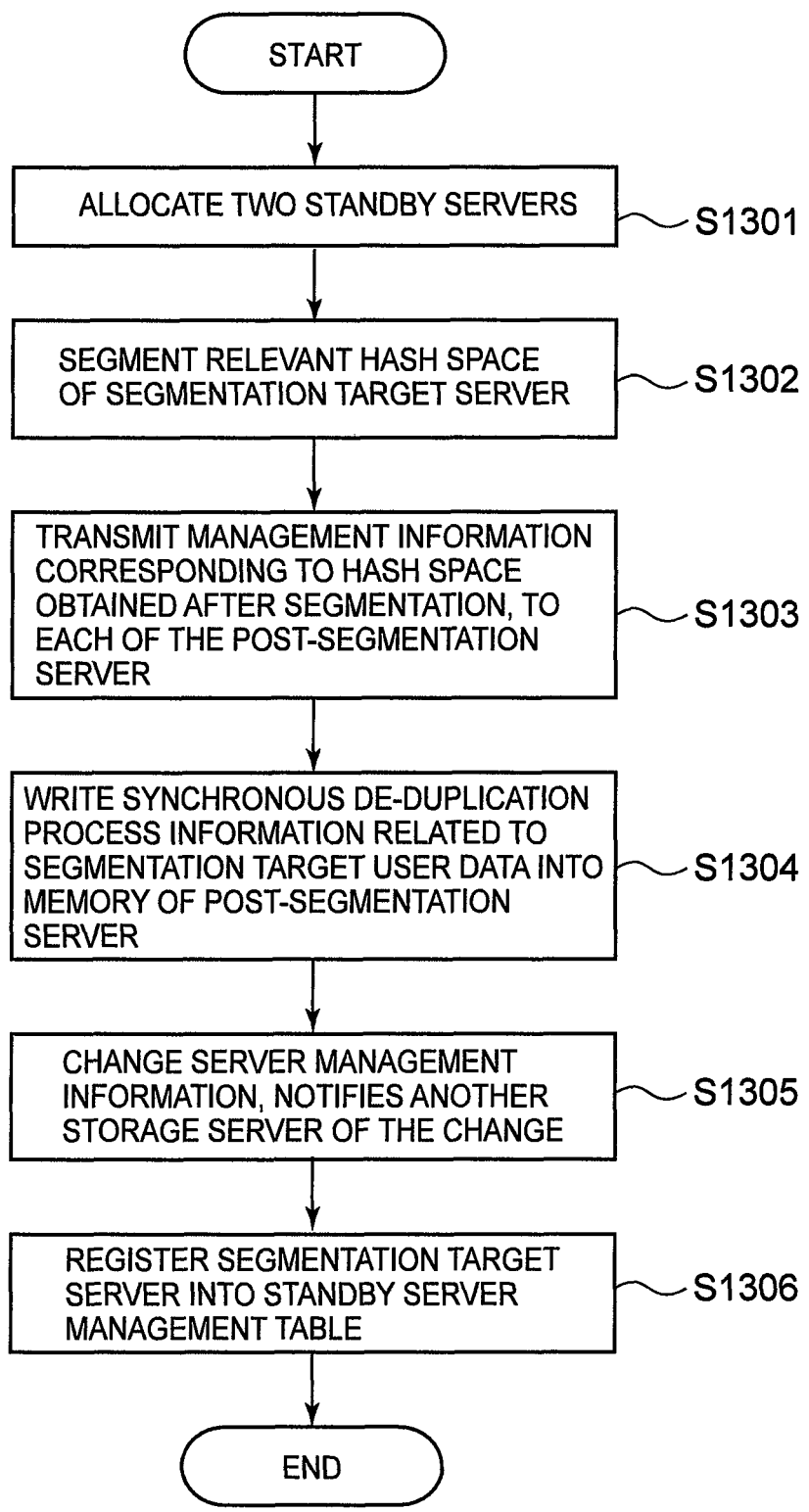
FIG. 26 is a flowchart of a server segmentation process.

FIG. 26 is a flowchart of the server segmentation process.

First, the server segmentation processing part 1901 refers to the standby server management table 2003 and allocates two standby servers 201 (S1301).

The server segmentation processing part 1901 then segments the name hash space and the data hash space (both hash spaces are altogether referred to as "relevant hash space" hereinafter) managed by the storage server 201 taken as the target of segmentation (to be referred to as "segmentation target server" hereinafter) (S1302). For example, when the relevant hash space is "0b1*," this relevant hash space may be segmented equally into two of "0b10*" and "0b11*" or may be segmented into two of "0b100*" and "0b101*"+"0b11*." Segmentation of the relevant hash space is performed in consideration of, for example, the load on the storage server 201. Either one of the standby servers (to be referred to as "post-segmentation server" hereinafter) 201 allocated in step S1301 is in charge of each of the segmented hash spaces. Hereinafter, the segmented hash spaces that are handled by the post-segmentation server 201 are called "segmented relevant hash spaces."

Next, the server segmentation processing part 1901 transfers management information corresponding to the segmented relevant hash spaces (a section related to the segmented relevant hash spaces out of the user data management information 310 and a section related to the segmented relevant hash spaces out of the full list information 311) to each of the post-segmentation servers (S1303).

The server segmentation processing part 1901 then generates the synchronous de-duplication process information 307 related to the user data contained in each segmented relevant hash space, for each segmented relevant hash space (the user data is referred to as "segmentation target user data" hereinafter). Then, the server segmentation processing part 1901 writes the generated synchronous de-duplication process information 307 into the memory 204 of the post-segmentation server 201 that is in charge of the segmented relevant hash space (S1304). In other words, the segmentation target user data, the fingerprint data 312 related to the segmentation target user data, and the partial list information 601 and summary bitmap 602 that are generated with respect to the segmentation target user data are written into the memory 204 of the post-segmentation server 201.

Subsequently, the server segmentation processing part 1901 changes the server management information 1910 to the contents obtained after the segmentation, and notifies the other storage servers 201 of the change (S1305).

After the completion of notification of the change in the server management information 1910 and transfer of the data items to the post-segmentation server 201, the server segmentation processing part 1901 registers the segmentation target server 201 to the standby server management table 2003 (S1306).

Note that the present example employs a system in which two standby servers 201 are allocated and the entire process of the segmentation target server 201 is carried out by the standby servers 201, but the present example may employ a system in which one standby server 201 is allocated and the process of the segmentation target server 201 is partially carried out by the standby server 201.

Figure 27:
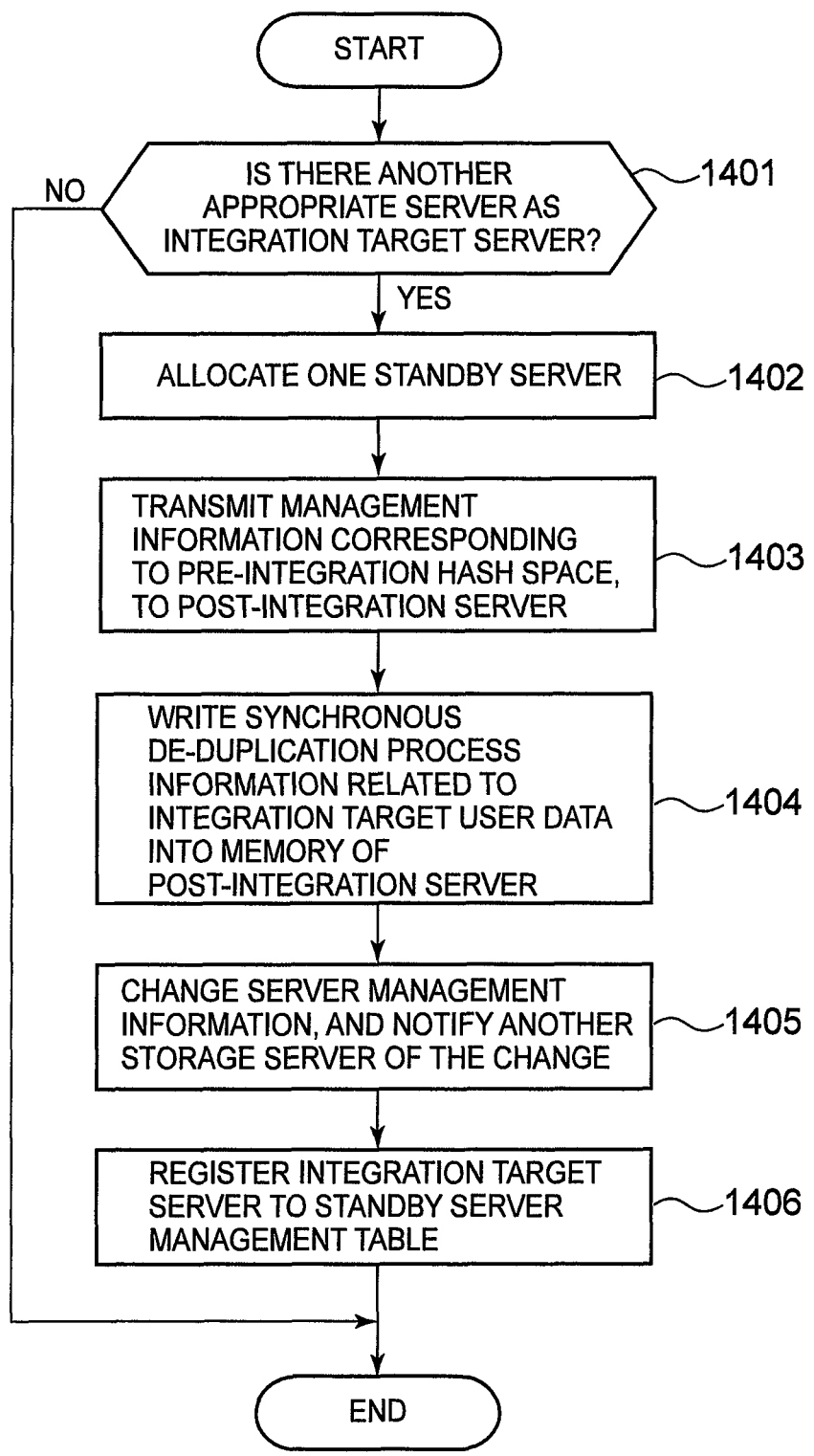
FIG. 27 is a flowchart of a server integration process.

FIG. 27 is a flowchart of the server integration process.

This process is carried out by the server integration processing part 1902 of one of the storage servers 201 that are the targets of integration (to be referred to as "integration target server" hereinafter).

First, the server integration processing part 1902 determines whether there is another appropriate server 201 as the integration target server 201 (S1401).

When the appropriate server 201 does not exist as the integration target server 201 (S1401: NO), the server integration processing part 1902 ends the process.

On the other hand, when the appropriate server 201 exists as the integration target server 201 (S1401: YES), the server integration processing part 1902 determines this appropriate server 201 as another integration target server 201. In other words, in the present example, the two servers 201, that is, the server 201 executing this process and the server 201 determined as described above, are obtained as the integration target servers 201. The server integration processing part 1902 refers to the standby server management table 2003 and allocates one standby server 201 (S1402).

Next, the server integration processing part 1902 transfers, to the standby server 201 allocated in step S1402 ("post-integration server"), management information corresponding to the hash space handled by each integration target server (to be referred to as "pre-integration relevant hash space" hereinafter) (a section related to the pre-integration relevant hash space out of the user data management information 310, and a section related to the pre-integration relevant hash space out of the full list information 311) (S1403). The two pre-integration relevant hash spaces are integrated into one hash space handled by a post-integration server 201 (to be referred to as "integrated relevant hash space" hereinafter).

The server integration processing part 1902 then generates the synchronous de-duplication process information 307 related to the user data contained in the integrated relevant hash space, for the integrated relevant hash space (to be referred to as "integration target user data" hereinafter). Then, the server integration processing part 1902 writes the generated synchronous de-duplication process information 307 into the memory 204 of the post-integration server 201 that is in charge of the integrated relevant hash space (S1404). In other words, the integration target user data, the fingerprint data 312 related to the integration target user data, and the partial list information 601 and summary bitmap 602 that are generated with respect to the integration target user data are written into the memory 204 of the post-integration server 201.

The server integration processing part 1902 then changes the server management information 1910 to the contents obtained after the integration, and notifies the other storage servers 201 of the change (S1405).

After the completion of notification of the change in the server management information 1910 and transfer of the data items to the post-integration server 201, the server integration processing part 1902 registers each of the integration target servers 201 to the standby server management table 2003 (S1406).

Note that the present example employs a system in which one standby server 201 is allocated and the entire process of each integration target server 201 is carried out by the standby server 201, but the present example may employ a system in which integration into either one of the integration target servers 201 is carried out without allocating any standby servers 201.

The several examples of the present invention described above are merely exemplary of the present invention and do not limit the scope of the present invention to these examples. The present invention can be implemented in various other examples as well without departing from the scope of the present invention.

REFERENCE SIGNS LIST

101 Client
102 Communication network
103 Storage system

The invention claimed is:

1. A storage system comprising:
a communication interface device coupled to a communication network to which a client is coupled;
a storage device in which a plurality of user data is stored; and
a controller, which is configured to manage ranks of the plurality of user data and select comparison target data in the plurality of user data based on the ranks of the plurality of user data, wherein when the storage system receives a write request from the client, the controller is configured to:
determine whether write target data of the write request overlaps with the selected comparison target data stored in the storage device;
not store the write target data in the storage device and register the write target data as duplicated data when the write target data is determined to overlap with the selected comparison target data; and
store the write target data in the storage device when the write target data is determined not to overlap with the selected comparison target data,
wherein the storage system has a memory,
wherein the selected comparison target data is stored in both the storage device and the memory,
wherein the controller is configured to determine whether the write target data of the write request overlaps with the selected comparison target data stored in the storage device using the selected comparison target data stored in the memory,
wherein a rank of the selected comparison target data is higher than a rank of data which is not selected in the plurality of user data, and
wherein the controller is configured to:
determine whether the write target data conforms with a condition of an asynchronous de-duplication process when the write target data is determined to be duplication unknown data; and
store the write target data in the storage device when the write target data does not conform with the condition of the asynchronous de-duplication process.

2. The storage system according to claim 1,
wherein when the write target data conforms with the condition of the asynchronous de-duplication process, the controller is configured to:
store the write target data;
determine whether the stored write target data overlaps with other data in the plurality of user data; and
delete the stored write target data or the other data overlapping with the stored write target data from the storage device as the asynchronous de-duplication process, when the stored write target data is determined to overlap with the other data in the plurality of user data.

3. The storage system according to claim 1,
wherein the controller is further configured to:
generate a data hash value of the write target data; and
determine whether the write target data of the write request overlaps with the selected comparison target data stored in the storage device using the generated data hash value of the write target data.

* * * * *